United States Patent
Kamikawa et al.

(10) Patent No.: US 7,539,572 B2
(45) Date of Patent: May 26, 2009

(54) IMAGE DISPLAY

(75) Inventors: Noriyuki Kamikawa, Kobe (JP); Yasuo Matsumoto, Kobe (JP); Takashi Ohta, Kobe (JP); Takao Yamaguchi, Kobe (JP); Shoji Fujimoto, Kobe (JP); Hiroshi Takeuchi, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 0 days.

(21) Appl. No.: 10/272,856

(22) Filed: Oct. 18, 2002

(65) Prior Publication Data

US 2003/0078724 A1 Apr. 24, 2003

(30) Foreign Application Priority Data

| Oct. 19, 2001 | (JP) | ............................. 2001-321823 |
| Jun. 7, 2002 | (JP) | ............................. 2002-166512 |
| Jun. 24, 2002 | (JP) | ............................. 2002-182480 |

(51) Int. Cl.
*G08G 1/137* (2006.01)
*G08G 1/13* (2006.01)
*G01C 21/26* (2006.01)

(52) U.S. Cl. .................. 701/207; 701/209; 340/995.14; 340/995.17; 340/995.27

(58) Field of Classification Search ................ 701/208, 701/211, 212, 200, 209, 207; 340/990, 995.11, 340/995.17, 995.14, 995.1, 995.2, 995.27, 340/995.24; 345/698, 613, 640, 641, 636
See application file for complete search history.

(56) References Cited

U.S. PATENT DOCUMENTS

| 4,477,830 | A | * | 10/1984 | Lindman et al. ............ 348/589 |
| 4,876,651 | A | * | 10/1989 | Dawson et al. ............. 701/200 |
| 5,396,431 | A | * | 3/1995 | Shimizu et al. ............. 701/213 |
| 5,406,493 | A | * | 4/1995 | Goto et al. .................. 701/208 |
| 5,801,680 | A | * | 9/1998 | Minakuchi .................. 345/589 |
| 5,982,298 | A | * | 11/1999 | Lappenbusch et al. ...... 340/905 |
| 5,983,158 | A | * | 11/1999 | Suzuki et al. ............... 701/209 |
| 6,157,342 | A | * | 12/2000 | Okude et al. ........... 342/357.13 |
| 6,182,010 | B1 | * | 1/2001 | Berstis ....................... 701/211 |
| 6,285,317 | B1 | * | 9/2001 | Ong ...................... 342/357.13 |
| 6,321,158 | B1 | * | 11/2001 | DeLorme et al. ........... 701/201 |
| 6,421,604 | B1 | * | 7/2002 | Koyanagi et al. ........... 701/208 |

(Continued)

FOREIGN PATENT DOCUMENTS

JP 01-163608 6/1989

(Continued)

*Primary Examiner*—Thomas G Black
*Assistant Examiner*—Christine M Behncke
(74) *Attorney, Agent, or Firm*—Wenderoth, Lind & Ponack, L.L.P.

(57) ABSTRACT

An image display whereby one can extremely easily know the current position of one's own vehicle and also grasp the actual situation around the current position of the vehicle, and with which the user gets highly satisfied. The image display includes a display device to display a photo picture on a prescribed reduced scale which is prepared based on photo data on a first scale that is read from a storage device in which photo data of two or more types in different scales to one area is stored, and a display switching device to conduct display switching according to a user's command to a photo picture on another reduced scale which is prepared based on photo data in a second scale that is different from the first scale.

7 Claims, 33 Drawing Sheets

U.S. PATENT DOCUMENTS

| | | | |
|---|---|---|---|
| 6,470,265 B1* | 10/2002 | Tanaka | 701/208 |
| 6,477,526 B2* | 11/2002 | Hayashi et al. | 707/4 |
| 6,535,814 B2* | 3/2003 | Huertgen et al. | 701/210 |
| 6,577,341 B1* | 6/2003 | Yamada et al. | 348/272 |
| 6,621,423 B1* | 9/2003 | Cooper et al. | 340/995.24 |
| 6,914,626 B2* | 7/2005 | Squibbs | 348/231.3 |
| 7,110,592 B2* | 9/2006 | Kotake et al. | 382/154 |
| 7,151,546 B1* | 12/2006 | Louveaux | 345/619 |
| 2001/0035880 A1* | 11/2001 | Musatov et al. | 345/764 |
| 2001/0055373 A1* | 12/2001 | Yamashita | 379/90.01 |
| 2002/0110362 A1* | 8/2002 | Ando et al. | 386/95 |
| 2002/0147661 A1* | 10/2002 | Hatakama et al. | 705/26 |
| 2002/0177944 A1* | 11/2002 | Ihara et al. | 701/208 |
| 2003/0182052 A1* | 9/2003 | DeLorme et al. | 701/201 |
| 2005/0207672 A1* | 9/2005 | Bernardo et al. | 382/284 |

FOREIGN PATENT DOCUMENTS

| | | |
|---|---|---|
| JP | 01-193889 | 8/1989 |
| JP | 05-113343 | 5/1993 |
| JP | 05-240724 | 9/1993 |
| JP | 2000-283784 | 10/2000 |

* cited by examiner

Fig.20

| | Classification | Address coordinates | Space information |
|---|---|---|---|
| Facility A | School | $(x_{10}, y_{10})$ | $(x_{11}, y_{11}), (x_{12}, y_{12}), (x_{13}, y_{13}),$ $(x_{14}, y_{14})$ |
| Facility B | Convenience store | $(x_{20}, y_{20})$ | $(x_{21}, y_{21}), (x_{22}, y_{22}), (x_{23}, y_{23}),$ $(x_{24}, y_{24}), (x_{25}, y_{25})$ |
| Facility C | Bank | $(x_{30}, y_{30})$ | $(x_{31}, y_{31}), (x_{32}, y_{32}), (x_{33}, y_{33}),$ $(x_{34}, y_{34})$ |
| Facility D | Park | $(x_{40}, y_{40})$ | |

IMAGE DISPLAY

BACKGROUND OF THE INVENTION

1. Field of the Invention

The present invention relates to an image display and, more particularly, to an image display, which is adopted specifically in a navigation system, using real image data corresponding to images such as satellite photographs or air photographs of the surface of the earth.

2. Description of the Relevant Art

FIG. 34 is a block diagram schematically showing the principal part of a navigation system in which a conventional image display is adopted. A speed sensor 2 for acquiring the distance in which a vehicle travels by computing the vehicle speed, and a gyro sensor 3 for acquiring the direction in which the vehicle is headed are connected to a microcomputer 10, which concludes the position of one's car (vehicle) based on the computed distance in which the vehicle has traveled and the direction in which the vehicle is heading (self-contained navigation).

A GPS receiver 4, which receives GPS signals from satellites through an antenna 5, is connected to the microcomputer 10, which concludes the position of one's car based on the received GPS signals (GPS navigation).

A DVD drive 6, which can capture electronic map data and the like from a DVD-ROM 7 (a storage device such as a CD-ROM is also allowed) in which electronic map data and the like are stored, is connected to the microcomputer 10, which displays a map picture wherein one's car position is precisely shown on a display panel 9b with matching the concluded car position with the electronic map data (conducting so-called map-matching). Here, the electronic map data can be also stored in a DVD-RAM which enables a map to be updated or in an HDD (hard disk).

Switch signals that are output from a joystick 8a or button switches 8b arranged on a remote control 8, or switch signals that are output from button switches 9a arranged on a monitor 9 are input to the microcomputer 10, wherein the processing corresponding to these switch signals is conducted. For example, when capturing information about a travel goal from these switches, the microcomputer 11 finds an optimum route from one's car position to the goal and displays the optimum route as a guidance route with a map picture on the display panel 9b.

Accordingly, in the navigation system, a map picture is displayed on the display panel 9b, and a goal entered by a user, a guidance route to the goal, one's car position mark corresponding to the current position of one's car, a past driving trail of one's car and the like are overlaid for display on the map. The navigation system has an excellent function in that, by seeing this display panel 9b sequentially, the user can obtain course information and reach the goal in accordance with the course information.

However, in the navigation system in which the above-described conventional image display is adopted, since a map image to be displayed is prepared by using map data, it is difficult to know the current position of one's own vehicle through the map image, or to grasp the actual situation around the current position of one's own vehicle.

That is because it is difficult to express the vertical relation between multilevel crossing roads or the like using the map image, and because there are actually a large number of roads, buildings and the like which are not shown on the map image.

As one of methods for solving this problem, an invention has been disclosed, wherein the current position of one's own vehicle is displayed on an air photo image that is prepared from air photo data (Japanese Kokai No. 05-113343). As an advantage in using the air photo image, buildings and the like as landmarks become very noticeable, so that it becomes easier to know the current position of one's own vehicle, and it can also be made easier to grasp the actual situation around the current position of one's own vehicle.

However, a navigation system with which the user gets sufficiently satisfied could not be realized simply by displaying air photo pictures.

In addition, it is not true that in any case an air photo image that is prepared by using air photo data makes it easier to know the current position one's own vehicle and also makes it easier to grasp the situation around the current position of one's own vehicle, as compared with a map image that is prepared by using map data. There are cases where the map image makes it easier to know the current position of one's own vehicle rather than the air photo image.

For those reasons, it appears that as the next generation of navigation systems, those in which both air photo images and map images are used, neither systems in which only air photo images are used, nor conventional systems in which only map images are used, as a matter of course, will be mainstream. Therefore, the proper use of both real images such as air photo images and map images, which have different features from each other, will be important in the future.

SUMMARY OF THE INVENTION

The present invention was accomplished in order to solve the above-described problem, and it is an object of the present invention to provide an image display, which is adopted specifically in a navigation system, properly using both displays of real images such as air photo images and map images that are prepared with map data, thereby resulting in a higher satisfaction for a user.

In order to achieve the above-described object, an image display according to a first aspect of the present invention is characterized as an image display which has a first photo picture preparing device for preparing a photo picture on a prescribed reduced scale based on photo data that is read from a photo data storage device in which photo data showing the surface of the earth is stored, and a photo picture display device for displaying a photo picture on the prescribed reduced scale which is prepared by the first photo picture preparing device, comprising a second photo picture preparing device for preparing a photo picture on another reduced scale which is different from the prescribed reduced scale based on the photo data, and a first display switching device for conducting display switching to a photo picture on the another reduced scale which is prepared by the second photo picture preparing device with a user's command so as switch the reduced scale, wherein the first and second photo picture preparing devices prepare the photo pictures without enlargement.

An image display according to a second aspect of the present invention is characterized as an image display which has a first photo picture preparing device for preparing a photo picture on a prescribed reduced scale based on photo data on a prescribed scale that is read from a photo data storage device in which photo data of two or more types on different scales to one area is stored, and a photo picture display device for displaying a photo picture on the prescribed reduced scale which is prepared by the third photo picture preparing device, comprising a second photo picture preparing device for preparing a photo picture on another reduced scale which is different from the prescribed reduced scale based on photo data on another scale which is different from the prescribed scale that is read from the photo data storage device, and a display switching device for conducting display switching to a photo picture on the another reduced scale which is prepared by the second photo picture preparing device with a user's command so as to switch the reduced scale.

By using an image display wherein the reduced scale of pictures to be displayed cannot be changed, for example, when the reduction ratio is large (resulting in a detailed display), a large-scale facility such as a theme park sometimes cannot be shown within a display screen, and therefore, the overall situation thereof cannot be known. On the other hand, when the reduction ratio is small (resulting in a wide-area display), the situation of the facility sometimes cannot be known in detail, thereby leading to a stress on the user.

By using the image display of the first or second aspect, when a command to switch the reduced scale is given by the user, display switching from a photo picture (such as a satellite photograph or an air photograph) on a prescribed reduced scale to a photo picture on another reduced scale which is different from the prescribed reduced scale is conducted, thereby resolving the stress on the user.

By using the image display of the first aspect, these photo pictures are prepared without enlargement. Therefore, for example, in a case where photo data on a scale of 2 m per pixel is stored in the first photo data storage device, a photo picture on a scale of 1 m per pixel, being enlarged as compared with the photo picture on the scale of 2 m per pixel, is not prepared. As a result, blurred photo pictures are never displayed, and thus, only sharp pictures can be provided to the user.

Further, since photo data has a considerably large amount of data, as compared to map data, it takes considerable more time to read photo data from a storage device or to process images. Therefore, it is difficult to conduct scaling of pictures in a short period of time as in a case of utilizing map data.

By using the image display of the second aspect, since two or more photo pictures on different reduced scales are prepared based on photo data of two or more types on different scales to one area (such as photo data on a scale of 1 m per pixel and photo data on a scale of 2 m per pixel), the scaling of pictures is not required, thereby leading to a realization of speedy display switching.

An image display according to a third aspect of the present invention is characterized as an image display which has a map picture preparing device for preparing a map picture based on map data that is read from a map data storage device in which map data is stored, and a first map picture display device for displaying a map picture which is prepared by the map picture preparing device, comprising a photo picture preparing device for preparing a photo picture showing the periphery of the current position of one's own vehicle based on photo data regarding the periphery of the current position of one's vehicle which is read based on the current position information of one's vehicle from a photo data storage device in which photo data showing the surface of the earth covering limited areas is stored, a position judging device for judging whether one's vehicle is within the areas based on one's current position information, and a photo picture display device for displaying a photo picture showing the periphery of the current position of one's vehicle which is prepared by the photo picture preparing device when the position judging device judges that the vehicle is within the areas.

An image display according to a further aspect of the present invention is characterized as an image display which has a map picture preparing device for preparing a map picture based on map data that is read from a map data storage device in which map data is stored, and a map picture display device for displaying a map picture which is prepared by the map picture preparing device, comprising a photo picture preparing device for preparing a photo picture showing the periphery of the current position of one's own vehicle based on photo data regarding the periphery of the current position of one's vehicle which is read based on the current position information of one's vehicle from a photo data storage device in which photo data showing the surface of the earth covering limited areas is stored, a position judging device for judging whether one's vehicle is within the areas based on the current position information, and a photo picture display device for displaying a photo picture showing the periphery of the current position of one's vehicle which is prepared by the photo picture preparing device with a user's command to display the photo picture while one's vehicle has been judged to be within the areas by the position judging device.

An image display according to a fifth aspect of the present invention is characterized as an image display which has a map picture preparing device for preparing a map picture based on map data that is read from a map data storage device in which map data is stored, and a map picture display device for displaying a map picture which is prepared by the map picture preparing device, comprising a photo picture preparing device for preparing a photo picture showing the periphery of the current position of one's own vehicle based on photo data regarding the periphery of the current position of one's vehicle which is read based on the current position information of one's vehicle from a photo data storage device in which photo data showing the surface of the earth covering limited areas is stored, a position judging device for judging whether one's vehicle is within the areas based on the current position information, a switch forming device for forming a command switch for giving a command to display the photo picture when the position judging device judges that one's vehicle is within the areas, and a photo picture display device for displaying a photo picture showing the periphery of the current position of one's vehicle which is prepared by the photo picture preparing device when the command switch is turned on by a user.

Since photo data has a considerably large amount of data, as compared with map data, it is extremely hard to record photo data covering an entire country on a scale of 1 m per pixel, for example, in a recording medium such as a DVD-ROM. Therefore, it is considered that photo data covering limited areas such as the major cities is recorded, while map data covering the entire country is recorded.

According to the image display of the third aspect, when going into the areas (e.g. major cities such as Tokyo and Osaka) whose photo data is recorded, a photo picture showing the periphery of current position of one's own vehicle (e.g. one's car) is automatically displayed, and therefore, the user can easily grasp the situation around one's own current position.

According the image display of the fourth or fifth aspect, the photo picture is displayed with a command to display the photo picture by the user while one's vehicle is within the areas, and therefore, the user can allow the photo picture to be displayed as the user desires.

Furthermore, by using the image display of the fifth aspect, a command switch for giving a command to display the photo picture is formed only when one's vehicle is within the areas. For example, in the case of the command switch being a touch button which is turned on by touching the screen, a touch button appears on the screen, and therefore, the user can easily recognize that the user is within the areas wherein the photo picture can be seen.

An image display according to a sixth aspect of the present invention is characterized as comprising a photo picture preparing device for preparing photo pictures showing prescribed spots (locations) based on photo data regarding the prescribed spots which exist on a guidance route or around the guidance route which is read based on the guidance route information from a photo data storage device in which photo data showing the surface of the earth is stored, and a photo picture display device for displaying a photo picture showing the prescribed spot which is prepared by the photo picture preparing device.

According to the image display of the sixth aspect, for example, when a switch forming device to form command switches for giving commands to display the photo pictures so as to correspond to each spot is mounted and a user turns on the command switch that is formed by the switch forming device, a photo picture showing the spot corresponding to the command switch which was turned on is displayed by the photo picture display device.

By the way, in map pictures which are displayed by a conventional navigation system, the expression has limits, and thus it is sometimes impossible to provide sufficient information concerning places having plural levels such as interchanges or places having complicated structures.

By using the image display of the sixth aspect, photo pictures showing prescribed spots (such as interchanges, service areas and tourist spots) that exist on a guidance route or around the guidance route are displayed. Therefore, since the places which are difficult to express in a map picture can be displayed with the photo pictures, the user can easily grasp the places. In addition, by showing tourist spots and the like having points which are worth seeing with the photo pictures, the drive can be made more enjoyable.

Furthermore, for example, by forming command switches for giving commands to display the photo pictures so as to correspond to each spot, the user can easily select a spot that the user desires.

An image display according to a seventh aspect of the present invention is characterized as comprising a photo picture preparing device for preparing a photo picture based on photo data that is read from a photo data storage device in which photo data showing the surface of the earth is stored, a photo picture display device for displaying a photo picture which is prepared by the photo picture preparing device, and a detailed information providing device for providing detailed information regarding spots to a user based on detailed data which is related to the spots that exist within the area which is shown in the photo picture that is read from a detailed data storage device in which detailed that is data related to prescribed spots is stored.

According to the image display of the seventh embodiment, for example, when a switch forming device for forming command switches for giving commands to provide the detailed information so as to correspond to each spot is mounted and a user turns on the command switch that is formed by the switch forming device, detailed information that is related to the spot corresponding to the command switch which was turned on is provided to the user by the detailed information providing device. By using the above image display of the seventh aspect, detailed information (such as information regarding admission fees and business days) which is related to spots (such as places of amusement and restaurants) that exist within the area that is shown in a photo picture is provided to the user. Therefore, an image display unit which can give the user a higher satisfaction can be realized.

Furthermore, for example, by forming command switches for giving commands to provide the detailed information so as to correspond to each spot, the user can easily select a spot that the user desires.

An image display according to an eighth aspect of the present invention is characterized as comprising a photo picture preparing device for preparing a photo picture showing the periphery of a goal based on photo data regarding the periphery of the goal which is read based on the goal position information from a photo data storage device in which photo data showing the surface of the earth is stored, and a photo picture display device for displaying the photo picture showing the periphery of the goal that is prepared by the photo picture preparing device.

An image display according to a ninth aspect of the present invention is characterized by the photo picture display device in the eighth aspect which displays the photo picture showing the periphery of the goal when the goal is selected by a user in the image display of the eighth aspect.

An image display according to a tenth aspect of the present invention is characterized by comprising a position judging device for judging whether one's vehicle reaches close to the goal based on the current position information of one's vehicle and the goal position information, wherein the photo picture display device of the eighth aspect displays the photo picture showing the periphery of the goal when the position judging device judges that one's vehicle has reached close to the goal in the image display of the eighth aspect.

By using any one of the image displays of the eighth through tenth aspects, since a photo picture showing the periphery of a goal is shown, the user can obtain a variety of information which is related to the goal such as information about whether the goal is in the midtown area, information about whether the road is wide or narrow, information about whether the area is densely built-up or not, or information about whether there are places of amusement or parking spaces.

By using the image display of the ninth aspect, since a photo picture showing the periphery of the goal is displayed when the goal is selected, the user can grasp the situation of the periphery of the goal in advance. By using the image display of the tenth aspect, since a photo picture showing the periphery of the goal is displayed when one reaches close to the goal, the user can grasp the situation of the periphery of the goal just before the arrival of the user's vehicle at the goal.

An image display according to an eleventh aspect of the present invention is characterized as an image display which has a map picture preparing device for preparing a map picture based on map data that is read from a map data storage device in which map data is stored, and a map picture display device for displaying a map picture which is prepared by the map picture preparing device, comprising a photo picture preparing device for preparing a photo picture based on photo data that is read from a photo data storage device in which photo data showing the surface of the earth is stored, and a display switching device for conducting display switching from the map picture to the photo picture and/or from the photo picture to the map picture by matching the area that is shown by the map picture with the area that is shown by the photo picture.

According to the image display of the eleventh aspect, the display switching device conducts the display switching, for example, with picture processing of a fade-in and/or a fade-out (thereby giving various kinds of display effects).

By using the image display of the eleventh aspect, display switching from a map picture to a photo picture or vice versa is conducted by matching the area that the map picture shows with the area that the photo picture shows, and therefore, the switching of these displays can be performed more naturally.

Furthermore, for example, if the display switching is conducted with image processing such as a fade-in and/or a fade-out (e.g. the transmittance of the screen display is variable in the 100% to 0% range), visually excellent display switching can be achieved.

An image display according to a twelfth aspect of the present invention is characterized as an image display which has a photo picture preparing device for preparing a photo picture showing the periphery of the current position of one's vehicle based on photo data that is related to the periphery of the current position of one's vehicle which is read based on the current position information from a first photo data storage device in which photo data showing the surface of the earth is stored, a photo picture display device for displaying a photo picture showing the periphery of the current position of one's vehicle which is prepared by the photo picture preparing device, and a current position display device for showing the current position of one's vehicle on the photo picture based on the current position information of one's vehicle, comprising a map picture preparing device for preparing a map picture based on map data that is read from a map data storage device in which map data is stored, and a display switching device for conducting step-by-step display switching from the photo picture to the map picture according to one's travel by making the display area of the photo picture smaller, while making the display area of the map picture larger based on current position information of one's vehicle.

According to the image display of the twelfth aspect, for example, it is desired that the display switching device should conduct the display switching by matching the area that is shown by the photo picture with the area that is shown by the map picture.

By the way, photo data has a considerably large amount of data, as compared with map data, and thus it sometimes takes considerable more time to read photo data from a storage device or to process images. Therefore, it is difficult, for example, to update the picture according to one's travel with a current position mark of one's own vehicle which is fixed on the display, as in the case of using map data.

In order to solve this problem, while the photo picture is fixed on the display, the current position mark of one's vehicle may be moved on the photo picture. However, the photo picture is not updated according to one's travel, and therefore the current position mark of one's vehicle will go out of the photo picture (or display).

By using the image display of the twelfth aspect, the display area of a photo picture is made smaller while the display area of a map picture is made larger. Since the display switching from the photo picture to the map picture is gradually conducted according to one's travel, visually excellent display switching can be achieved. Further, by conducting the display switching so that the current position mark of one's vehicle comes onto the map picture before the current position mark of one's vehicle goes out of the photo picture (display), the above problem can be also solved.

Furthermore, display switching can be conducted more naturally if the display switching is conducted by matching the area that is shown by the photo picture with the area that is shown by the map picture.

An image display according to a thirteenth aspect of the present invention is characterized as comprising a photo picture preparing device for preparing a photo picture based on photo data that is read based on a predetermined condition from a photo data storage device in which photo data that is taken in two or more different states to one area is stored, and a photo picture display device for displaying a photo picture which is prepared by the photo picture preparing device.

By using the image display of the thirteenth aspect, a photo picture which is prepared based on photo data that is read based on a predetermined condition (such as a photo taken in winter) from the fourth photo data storage device in which photo data that is taken in two or more different states to one area (such as by seasons or by time periods) is stored is displayed. For example, it is possible to display a photo picture which is prepared based on photo data taken in winter in the case of December so that an image display unit expressing a sense of the seasons can be realized.

An image display according to a fourteenth aspect of the present invention is characterized as an image display which has a map picture preparing device for preparing a map picture based on map data that is read from a map data storage device in which map data is stored, and a map picture display device for displaying a map picture which is prepared by the map picture preparing device, comprising a photo picture preparing device for preparing a photo picture based on photo data that is read from a photo data storage device in which photo data showing the surface of the earth is stored, and a multi-screen display device for displaying a map picture which is prepared by the map picture preparing device and a photo picture which is prepared by the photo picture preparing device on the same display screen.

By using the image display of the fourteenth aspect, a map picture (a picture whereby the location pattern of principal roads can be relatively easily known) and a photo picture (a picture whereby the peripheral situation can be relatively easily known) are displayed on the same display screen so that, for example, the location pattern of roads in an urban district and the peripheral situation can be effectively known.

An image display according to a fifteenth aspect of the present invention is characterized as comprising a photo picture preparing device for preparing a photo picture based on photo data that is read from a photo data storage device in which photo data showing the surface of the earth is stored, and a photo picture display device for displaying a photo picture which is prepared by the photo picture preparing device, wherein the photo picture preparing device prepares a photo picture on which prescribed image processing is conducted based on a predetermined condition. By using the image display of the fifteenth aspect, since a photo picture that is prepared with conducting prescribed processing (such as filtering) thereon on the basis of a predetermined condition (such as time periods) is displayed, for example, a night photo picture can be displayed after sunset, thereby resulting in realization of a unit which gives high satisfaction to the user.

An image display according to a sixteenth aspect the present invention is characterized as an image display which has a display control device for displaying a map image and a real image on the same scale concerning the same area on a display screen based on map data and real image data, wherein the display control device has a function of composing the map image and the real image so that in the background of either of the map image and the real image, the other image is overlaid in a given region, and only the other image can be seen in the composite region.

By using the image display of the sixteenth aspect, either image of the map image and the real image (such as a satellite photograph or an air photograph) is made to be a background and the other image is overlaid thereon on the same scale (reduced scale) to be displayed in the given region. Moreover, the composition of these images is further conducted so that only the other image can be seen in the region where these images are combined.

For example, when the map image is made to be a background, a coefficient of composition of the map image is set to be 0 in the given region, while the coefficient of composition of the real image is set to be 1 so as to conduct the composition of these images. In the given region, only the real image can be seen. As a result, on the display screen, with the map image as a background, only the real image is fitted in part thereof for display so that landmarks and the like can be grasped variously.

An image display according to a seventeenth aspect of the present invention is characterized as an image display which has a display control device for displaying a map image and a real image on the same scale concerning the same area on a display screen based on map data and real image data, wherein the display control device has a function of composing the map image and the real image so that in the background of either of the map image and the real image, the other image is overlaid in a given region, and through either of the map image and the real image, the other image can be seen in the whole or part of the composite region.

By using the above image display of the seventeenth aspect, with either the map image or the real image (such as a satellite photograph or an air photograph) as a background, the other image is overlaid thereon on the same scale (reduced scale) in the given region. For example, when the map image is made to be a background, on the display screen, with the map image as a background, the real image is overlaid on part thereof for display so that landmarks and the like can be grasped variously.

Moreover, by using the image display of the seventeenth aspect, in the whole region or part of the region where these images are combined, these images are composed so that through either of these images, the other image can be seen.

For example, when the map image is made to be a background, a coefficient of composition of the map image is set to be $\alpha$ ($0 \leq \alpha < 1$) in the given region, while the coefficient of composition of the real image is set to be $\beta$ ($=1-\alpha$) therein so as to conduct the composition of these images. In the given region, the map image can be seen through (the whole or part of) the real image. As a result, it becomes possible to provide a considerably large amount of information to a user.

An image display according to an eighteenth aspect of the present invention is characterized as comprising a composition level setting device which enables the setting of the composition level of the images, wherein the display control device of the seventeenth aspect composes the images based on the composition level that is set by the composition level setting device concerning the composite region in the image display of the seventeenth aspect.

By using the image display of the eighteenth aspect, since the setting of the composition level can be conducted, the user can freely make adjustments such as making the display brightness of the map image higher (that of the real image lower), or conversely making the display brightness of the real image higher (that of the map image lower) concerning the region where these images are combined. As a result, a display condition according to the user's preference can be realized.

An image display according to a nineteenth aspect of the present invention is characterized by the display control device, composing the images so that the display brightness of a background image becomes higher from the composite region toward the outside of the region in the image display of the seventeenth or eighteenth aspect.

By using the image display of the nineteenth aspect, since the composition of these images is conducted so that the display brightness of an image which is a background is made higher from the composite region toward the outside of the region, the smooth shift of the images from the composite region to the outside thereof can be achieved.

An image display according to a twentieth aspect of the present invention is characterized by the image display, being adopted in a navigation system which can guide a user to a goal by providing the user with information such as routes and maps that are required for reaching the goal, wherein the given region is any one of one's own peripheral area which is obtained based on one's position information, a peripheral area of the goal which is obtained based on the goal position information, a peripheral area of a preset facility which is obtained based on the preset facility position information, and a peripheral area of a preselected position which is obtained based on position information of the preselected position previously pointed to by the user in any of the image displays of the sixteenth through nineteenth aspects.

By the image display of the twentieth aspect, the given region is any one of one's own peripheral area, that of the goal, that of the preset facility (such as a station), and that of the preselected position (such as the user's home position) previously pointed to by the user. Therefore, for example, when the map image is a background, these areas are shown by using the real images.

As a result, since an area to be noted is displayed by using an image having a quality which is different from a background image, it is possible to differentiate the noted area from the other portion.

An image display according to a twenty-first aspect of the present invention is characterized by the image display being adopted in a navigation system which can guide a user to a goal by providing the user with information such as routes and maps that required for reaching the goal, wherein the given region is an almost upper half region or an almost lower half region on the display screen in any one of the image displays of the sixteenth through nineteenth aspects.

By using the image display of the twenty-first aspect, since the given region is an almost upper half region or an almost lower half region on the display screen, the almost upper half region can be displayed with the map image while the remaining almost lower half region can be displayed with the real image, or vice versa.

In a navigation system, in many cases, the periphery of the current position of one's vehicle is displayed in the lower portion of the display screen, while the place that is remote from one's current position is displayed in the upper portion of the display screen. Therefore, by using the image display of the twenty-first aspect, on the basis of the one's current position, an image on this side and that on the remote side can be differentiated (see FIG. 18).

An image display according to a twenty-second aspect of the present invention is characterized by the image display being adopted in a navigation system which can guide a user to a goal by providing the user with information such as routes and maps that are required for reaching the goal, wherein the given region is a peripheral area of the route which is obtained based on route information regarding the route in anyone of the image displays of the sixteenth through nineteenth aspects.

By using the image display of the twenty-second aspect, the given region is a peripheral area of the route. Therefore, for example, when the map image is a background, the route peripheral area is displayed by using the real image.

As a result, since the route peripheral area is displayed by using an image having a quality which is different from a background image, it is possible to differentiate the route peripheral area from the other portion.

An image display according to a twenty-third aspect of the present invention is characterized as an image display which has a first display control device for displaying a map image based on map data on a display screen, comprising a second display control device for displaying real images showing prescribed places on the same scale as the map image in the spaces of the prescribed places on the map image based on space information showing the spaces of the prescribed places on the map and real image data which are formed so as to be able to correspond to the position coordinates.

By using the image display of the twenty-third aspect, in the spaces of the prescribed places (places where a service station, a school, a park and the like exist) on the map image appearing on the display screen, the real images (e.g. satellite photographs or air photographs) showing the prescribed places on the same scale as the map image are displayed (see FIG. 23).

In a conventional image display, for example, in order to make it easy to grasp the situation in a map image appearing on a display screen, prominent marks such as a service station and a school, so-called landmarks are displayed on the map image. In the image display of the twenty-third aspect, however, real images showing facilities such as a service station and a school on the same scale as the map image are displayed. Therefore, the places appearing on the map image are real images, as a matter of course, and the sizes (plot areas) thereof are also displayed similarly to the actual sizes, so that it can be made considerably easy to grasp the situation that is shown by the map image.

An image display according to a twenty-fourth aspect of the present invention is characterized as an image display which has a first display control device for displaying a map image, which is based on map data, on a display screen, comprising a block computing device for finding a block where a prescribed place is included based on address information showing the address of the prescribed place, and a second display control device for displaying a real image showing a block on the same scale as the map image in the space of the block on the map image based on space information showing the space of the block computed by the block computing device and real image data that is formed so as to be able to correspond to the position coordinates.

By using the image display of the twenty-fourth aspect, in the space of a block (a range in which a park or the like is enclosed by relatively wide roads such as principal roads) including the prescribed place (a place where a service station, a school, a park or the like exists) on the map image appearing on the display screen, the real image (e.g. a satellite photograph or an air photograph) showing the block on the same scale as the map image is displayed (see FIG. 25).

Therefore, the place appearing on the map image is a real image, as a matter of course, and the size (plot area) thereof is also displayed similar to the actual size, so that it can be made considerably easy to grasp the situation that is shown by the map image. In addition, since not only the place but also the block where the place is included is displayed by using a real image, it is possible to inform the user of the actual situation of not only the place but also the periphery thereof.

When a real image which looks as if only the prescribed place were cut out is displayed on the map image as shown in the below-described FIG. 23, space information (or two-dimensional information) showing the space (or a plane) of a facility such as a school as information regarding the facility is required. However, when a real image is displayed showing a block where the prescribed place is included, address information showing the address (or a point) of a facility such as a school is enough. Therefore, the image display of the twenty-fourth aspect has an advantage in that it is not required to prepare the space information of a high level since the address information of a relatively low level is only required.

An image display according to a twenty-fifth aspect of the present invention is characterized as an image display which has a first display control device to display a map image, which is based on map data, on a display screen, comprising a second display control device for displaying a real image showing a prescribed place on the same scale as the map image in the space of the prescribed place on the map image based on space information showing the space of the prescribed place on the map and real image data which are formed so as to be able to correspond to the position coordinates, a block computing device for finding a block where the prescribed place is included based on address information showing the address of the prescribed place, a third display control device for displaying a real image showing a block on the same scale as the map image in the space of the block on the map image based on space information showing the space of the block which is computed by the block computing device and the real image data, and a switching control device for controlling the proper use of the control by the second display control device and the control by the third display control device depending on a predetermined condition.

By using the image display of the twenty-fifth aspect, a function of displaying the real image showing the prescribed place on the same scale as the map image in the space of the prescribed place on the map image appearing on the display screen, and a function of displaying the real image showing the block on the same scale as the map image in the space of the block where the prescribed place is included on the map image are available. Furthermore, these functions are properly used, depending on the predetermined condition. Therefore, since how to display a real image is properly changed depending on the condition, a more useful display mode can be realized (see FIG. 27).

Here, as the predetermined condition, usages of the prescribed places (such as classes of facilities) are exemplified. Further, as for a place such as a park whose boundary is ambiguous and hard to know, a real image showing not only the park itself but also a wide range (block) including the park is displayed on the map image.

An image display according to a twenty-sixth aspect of the present invention is characterized as comprising a place selection device which enables a selection of a specific place, wherein the prescribed place is the specific place selected by the place selection device in any one of the above image displays of the twenty-third through twenty-fifth aspects.

By using the image display of the twenty-sixth aspect, which has the place selection device, the user can freely select the specific place, and moreover, a real image showing the place that is selected by the user can be displayed on the map image. Therefore, a display mode which serves the user's desire can be realized.

An image display according to a twenty-seventh aspect of the present invention is characterized as comprising a usage selection device which enables a selection of a usage of a place, wherein the prescribed place is a place used for the usage which is selected by the usage selection device in any one of the above image displays of the twenty-third through twenty-fifth aspects.

By using the image display of the twenty-seventh aspect, which has the usage selection device, the user can freely select a usage of a place (such as a class of a facility), and moreover, a real image showing a place which is used for the usage that is selected by the user can be displayed on the map image. Therefore, a display mode which serves the user's desire can be realized.

An image display according to a twenty-eighth aspect of the present invention is characterized by an image display being adopted in a navigation system which can guide a user to a goal by providing information such as routes and maps which are required for reaching the goal to a user, comprising a storage device to store information regarding one's own past driving record and a place computing device for finding a specific place based on the driving record that is stored in the storage device, wherein the prescribed place is a place that is computed by the place computing device.

By using the image display of the twenty-eighth aspect, a real image showing a specific place (e.g. a place where a facility to which a visit was paid in the past exists) obtained based on the one's past driving record can be displayed on the map image. Therefore, since a place that is related to the past record of the user can be displayed as a real image, the past record can be ascertained through the contents displayed on the display screen.

An image display according to a twenty-ninth aspect of the present invention is characterized by an image display which has a first display control device for displaying a map image, which is based on map data, on a display screen, comprising a second display control device for displaying a real image showing a prescribed block on the same scale as the map image in the space of the block on the map image based on space information showing the space of the prescribed block and real image data that are formed so as to be able to correspond to the position coordinates.

By using the image display of the twenty-ninth aspect, in the space of the prescribed block (e.g. a range where a park or the like is enclosed by relatively wide roads such as principal roads) on the map image appearing on the display screen, the real image showing the prescribed block on the same scale as the map image is displayed (see FIG. 31).

That is, the real image is displayed as if the real image were inlaid in the space of the prescribed block so that it can be made considerably easy to grasp the situation that is shown by the map image.

An image display according to a twenty-fifth aspect of the present invention is characterized as an image display being adopted in a navigation system which can guide a user to a goal by providing the user with information such as routes and maps that are required for reaching the goal, comprising a storage device for storing information regarding one's own past driving record, and a zone computing device for finding a specific zone based on the driving record stored in the storage device, wherein the prescribed block is a block including a zone computed by the zone computing device in the image display of the twenty-ninth aspect.

By using the image display of the thirtieth aspect, a real image showing a specific block which is obtained based on one's past driving record (e.g. a block including a place where a facility to which a visit was paid in the past exists) can be displayed on the map image. Therefore, since a block that is related to the past record of the user can be displayed as a real image, the past record can be ascertained through the contents which are displayed on the display screen.

An image display according to a thirty-first aspect of the present invention is characterized as an image display which has a display control device for displaying a real image such as a satellite photograph or an air photograph showing the surface of the earth on a display screen based on real image data which is formed so as to be able to correspond to the position coordinates, wherein the display control device differentiates a prescribed block from the other portion so as to display the real image based on space information showing the space of the prescribed block and the real image data.

By using the image display of the thirty-first aspect, when the real image is displayed on the display screen, the prescribed block (e.g. the block to which the user has ever been) is differentiated from the other portion (e.g. blocks to which the user has never been) so as to display the real image (see FIG. 33).

Therefore, since the user can know a block to be more noticeable in an instant, a considerably useful unit can be realized. Here, as a method for differentiating the displays, a method is exemplified in which one is a color display while the other is a monochrome display.

An image display according to a thirty-second aspect of the present invention is characterized as comprising a block selection device which enables a selection of a specific block, wherein the prescribed block is the specific block which is selected by the block selection device in the image display of the thirty-first aspect.

By using the image display of the thirty-second aspect, which has the block selection device, the user can freely select the specific block, and moreover, it is possible to differentiate the display of the block that is selected by the user from the other portion. Therefore, a display mode which serves the user's desire can be realized.

An image display according to a thirty-third aspect of the present invention is characterized as an image display being adopted in a navigation system which can guide a user to a goal by providing the user with information such as routes and maps that are required for reaching the goal, comprising a storage device for storing information regarding the past driving record of the user, and a zone computing device for finding a specific zone based on the driving record stored in the storage device, wherein the prescribed block is a block including a zone computed by the zone which is computing device in the image display of the thirty-first aspect.

By using the image display of the thirty-third aspect, it is possible to differentiate a specific block (e.g. a block including a place where a facility to which a visit was paid in the past exists) which is obtained based on one's past driving record from the other portion in how they are displayed on the display screen. Therefore, through the contents that are displayed on the display screen, the user can know to which area he/she has ever been to and the like in an instant.

An image display according to a thirty-fourth aspect of the present invention is characterized as an image display which has a display control device for displaying a real image such as a satellite photograph or an air photograph showing the surface of the earth on a display screen based on real image data that is formed so as to be able to correspond to the position coordinates, wherein the display control device displays a real image such as a satellite photograph or an air photograph showing a specific area based on information showing the specific area such as a park or a facility.

By using the image display of the thirty-fourth aspect, a real image showing a specific area is displayed on the display screen based on information showing the specific area (e.g. a park or a facility). Therefore, a cut-out satellite photograph or the like showing only a park, a facility or the like can be displayed on the display screen. Here, as a method for swiftly conducting display processing of the real image, a method is exemplified in which information regarding plots (areas) of parks or facilities is previously prepared.

An image display according to a thirty-fifth aspect of the present invention is characterized as an image display which has a display control device for displaying a real image such as a satellite photograph or an air photograph showing the periphery of a specific position on a display screen based on real image data that is formed so as to be able to correspond to the position coordinates and position information of the specific position such as one's position, comprising a specific position display device for showing the specific position on a real image appearing on the display screen.

By using the image display of the thirty-fifth aspect, a real image showing the periphery of a specific position (such as one's car position) is displayed on the display screen, and moreover, the specific position is shown on the real image. Therefore, even in the case of a real image such as a satellite photograph appearing, the user can know around where his/her car is running.

BRIEF DESCRIPTION OF THE DRAWINGS

FIG. 20 is an illustration showing an example of the construction of facility data that is stored in a DVD-ROM in a navigation system in which an image display according to an eighth embodiment of the present invention is adopted;

DETAILED DESCRIPTION OF THE INVENTION

First Embodiment

Figure 1:
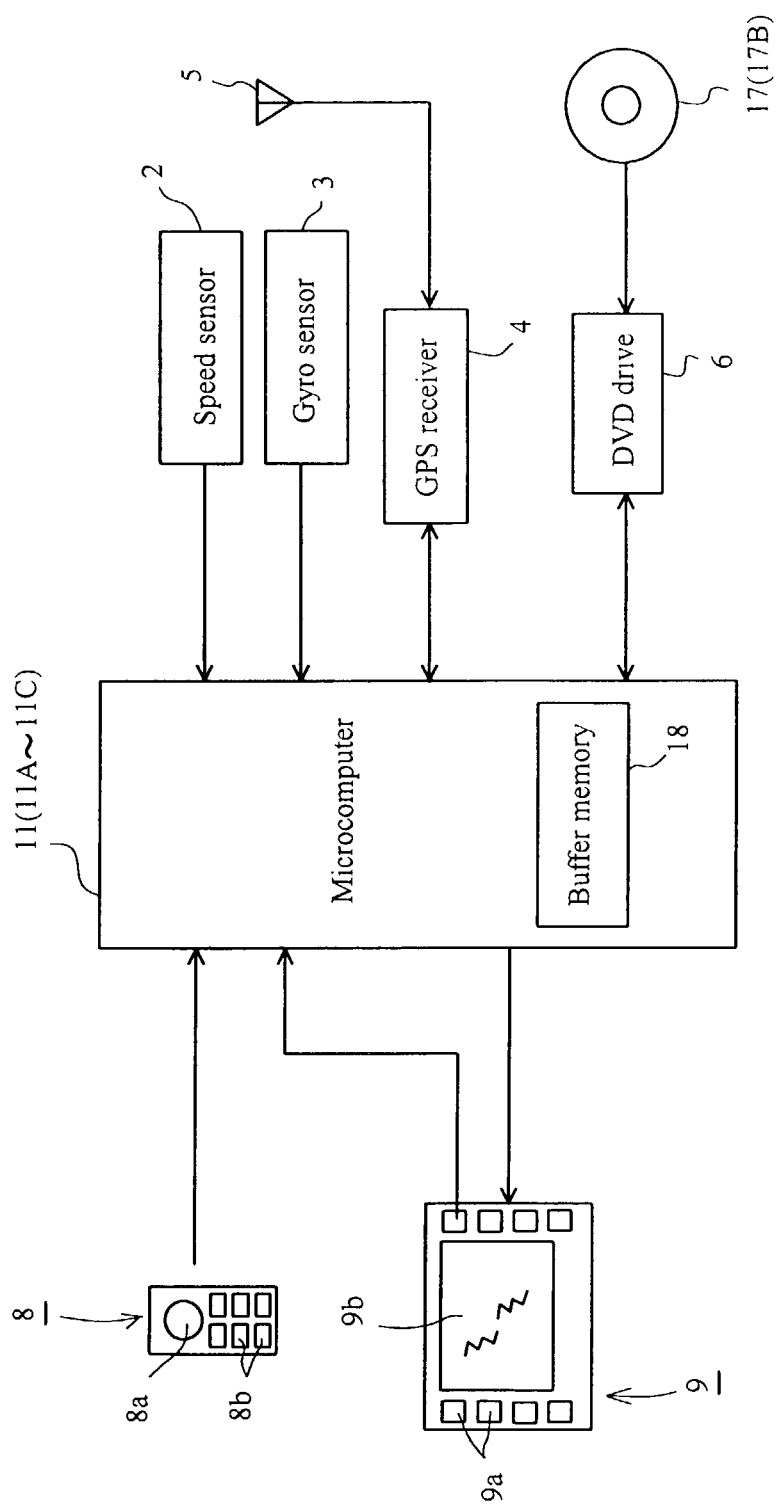
FIG. 1 is a block diagram schematically showing the principal part of a navigation system in which an image display according to a first embodiment of the present invention is adopted.
Figure 34:
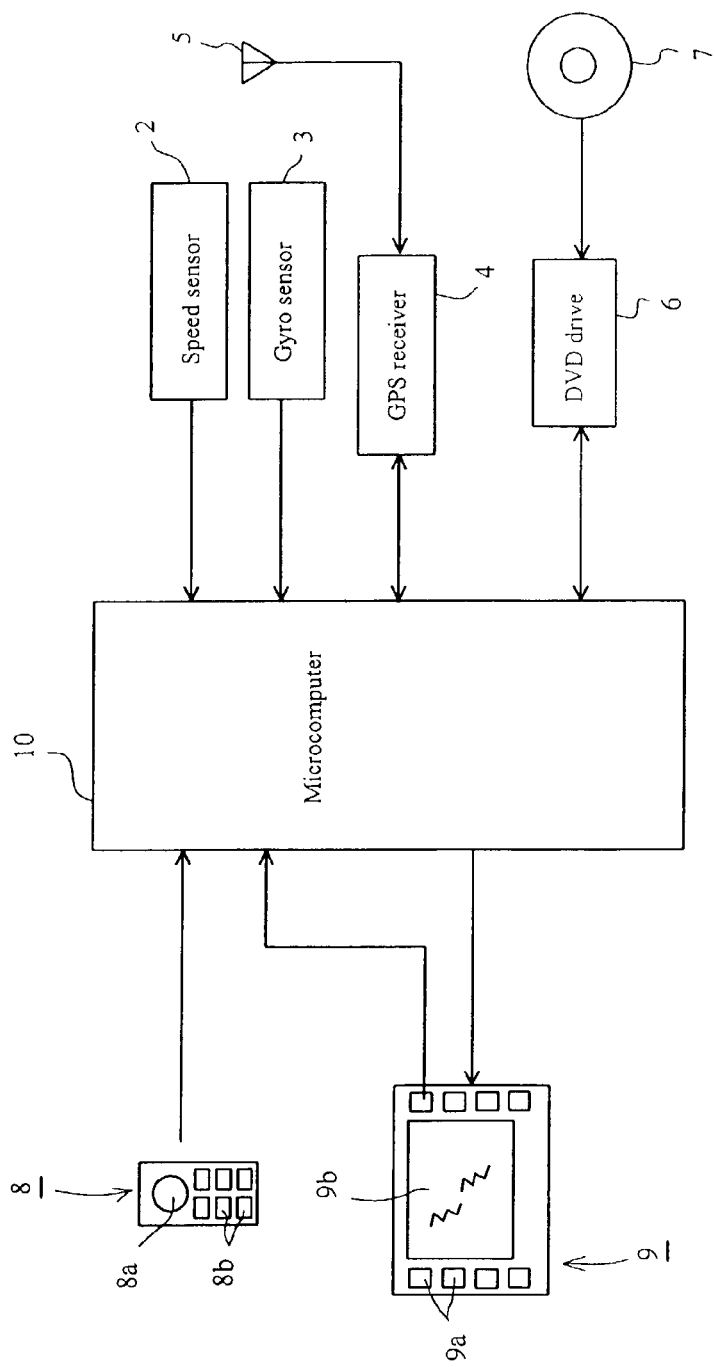
FIG. 34 is a block diagram schematically showing the principal part of a navigation system in which a conventional image display is adopted.

The preferred embodiments of the image display according to the present invention are described below by reference to the drawings annexed hereto. FIG. 1 is a block diagram schematically showing the principal part of a navigation system in which an image display according to a first embodiment of the present invention is adopted. Here, the same components as those of the navigation system shown in FIG. 34 are similarly marked, and thus are not described below.

A speed sensor 2 and a gyro sensor 3 are connected to a microcomputer 11, which concludes the position of one's car (vehicle) based on the computed distance traveled and the direction in which the car is heading (self-contained navigation). In addition, a GPS receiver 4 is connected to the microcomputer 11, which concludes the position of one's car based on GPS signals (GPS navigation).

A DVD drive 6, which can capture electronic map data, photo data and the like from a DVD-ROM 17 (a storage device such as a CD-ROM is also allowed), in which electronic map data covering, for instance, an entire country and photo data such as satellite photographs or air photographs showing the surface of the earth covering limited recorded areas (e.g. the major cities) are recorded, is connected to the microcomputer 11, which, based on the concluded current position of one's own car, calls up required map data or photo data from the DVD-ROM 17 and allows the same to be temporarily stored in a buffer memory 18 within the microcomputer 11. In the DVD-ROM 17, as photo data showing the surface of the earth covering the same area, for example, photographs on the scale of 1 m per pixel and those on the scale of 4 m per pixel are recorded.

At the top, bottom and both sides of a display panel 9b, multiple infrared LEDs and multiple phototransistors are arranged in opposed positions to each other so that the locations where a finger touches the display panel 9b can be detected. The detected results can be acquired by the microcomputer 11.

Figure 2:
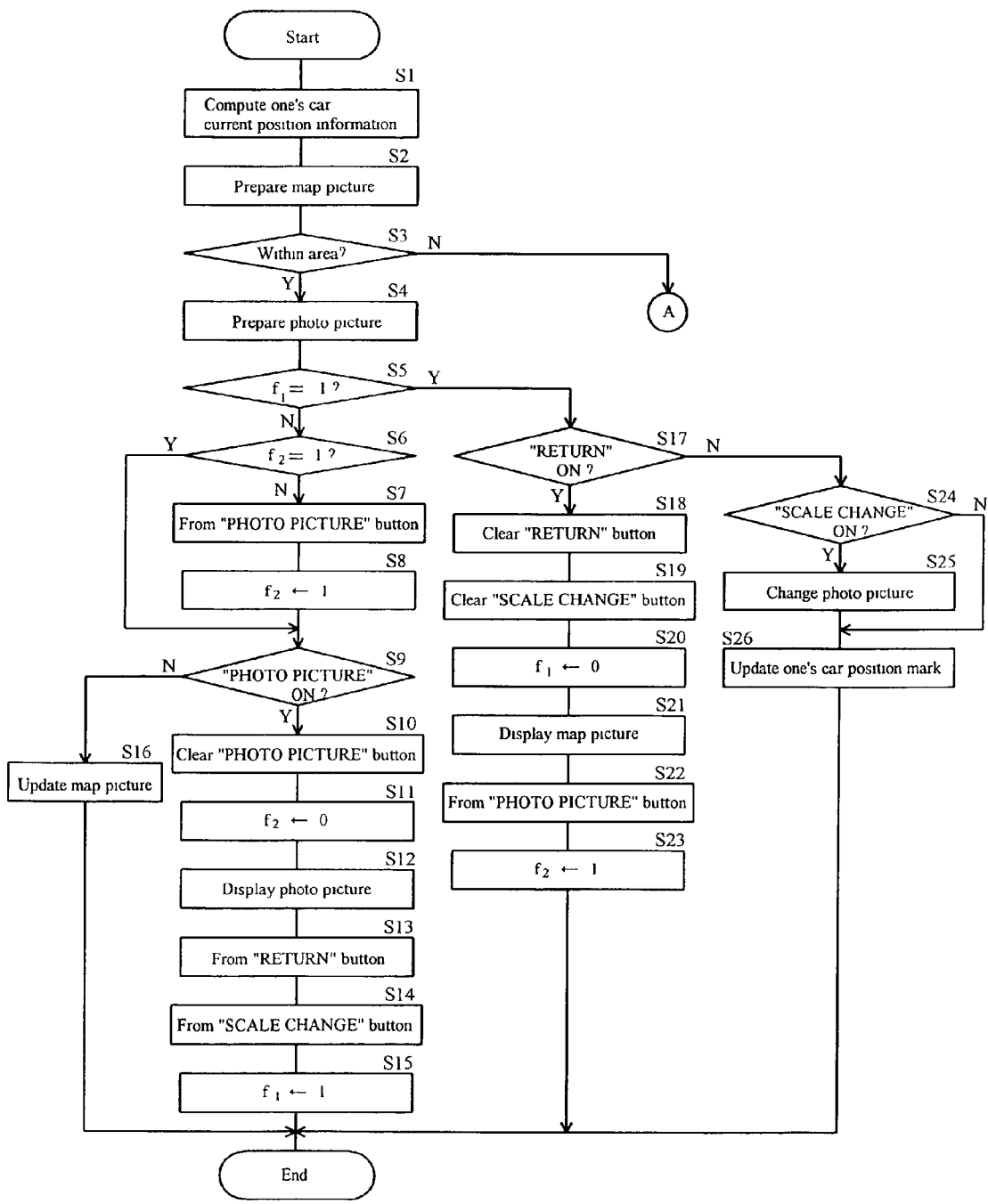
FIG. 2 is a flowchart showing the processing operation which is performed by a microcomputer in the navigation system in which the image display according to the first embodiment is adopted.
Figure 3:
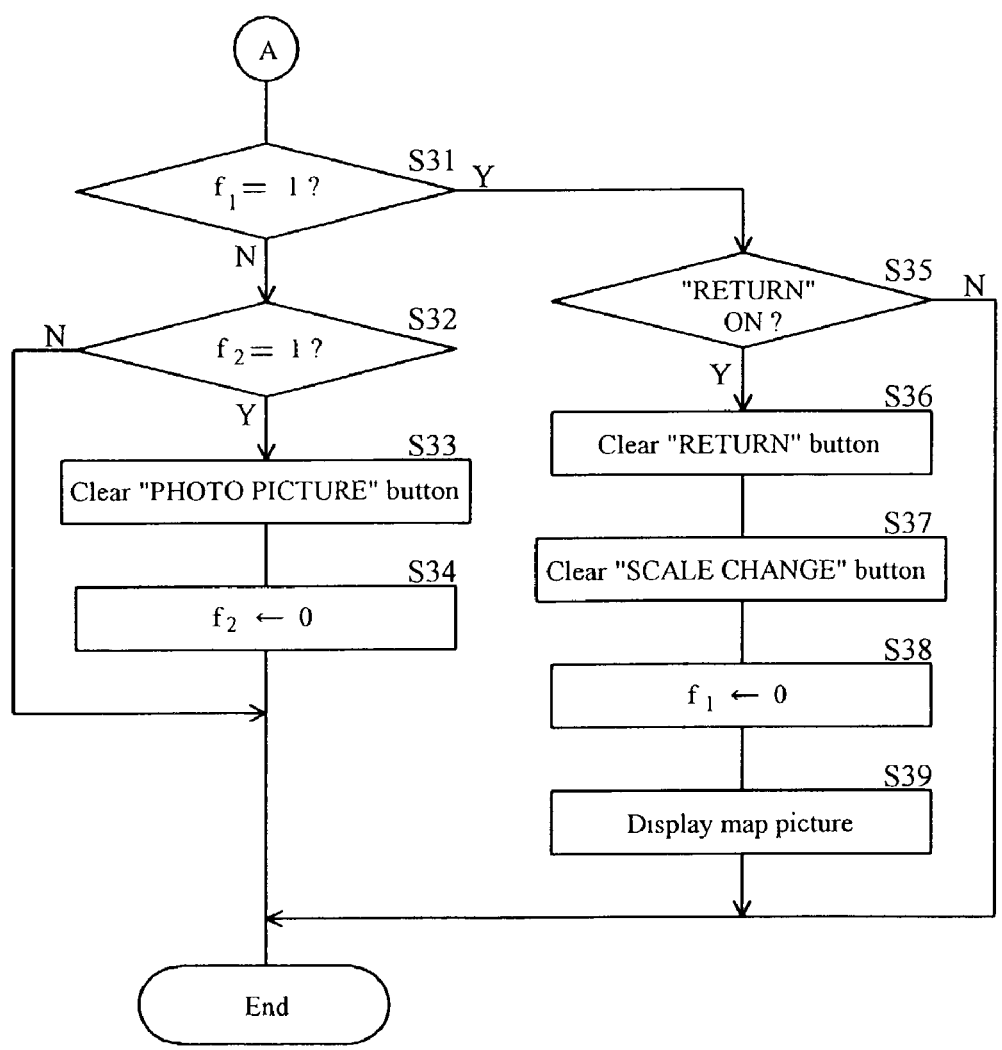
FIG. 3 is a flowchart showing the processing operation which is performed by the microcomputer in the navigation system in which the image display according to the first embodiment is adopted.

The processing operation ① which is performed by the microcomputer 11 in the navigation system in which the image display according to the first embodiment is adopted will now be described below with reference to the flowcharts shown in FIGS. 2 and 3. First, the current position of one's car is computed from GPS signals and the like (Step S1), and, based on the computed current position information and map data that is stored in the buffer memory 18, a map picture showing the periphery of the current position of one's car is prepared (Step S2). Here, the data regarding the prepared map picture is stored in the buffer memory 18 and is read out in accordance with the display timing.

Based on the current position information of one's own car and photo data that is stored in the buffer memory 18, it is judged in Step S3 whether or not one's own car is within the recorded areas (e.g. the major cities such as Tokyo and Osaka). When the car is judged to be within the recorded areas, photo pictures of two types (e.g. a photo picture of a wide-area display and a photo picture of a detailed display) showing the periphery of the current position of one's own car are prepared, based on the current position information of the car and the photo data on the two types of scales that are stored in the buffer memory 18 (Step S4). Here, the data regarding the prepared photo pictures is stored in the buffer memory 18 and is read out in accordance with the display timing.

Figure 4A:
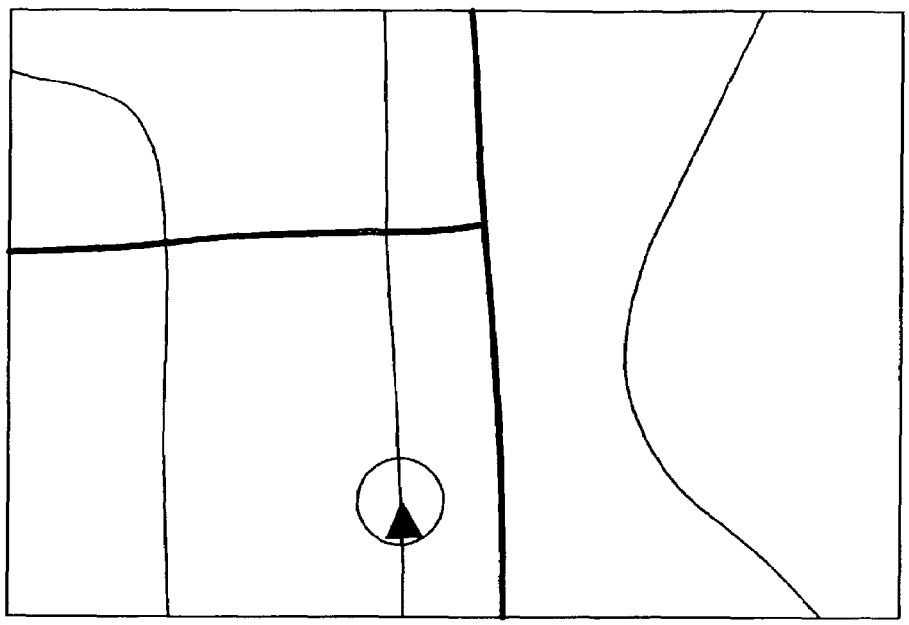
FIGS. 4(a) and 4(b) are illustrations showing a state where a map picture is displayed on a display panel.
Figure 4B:
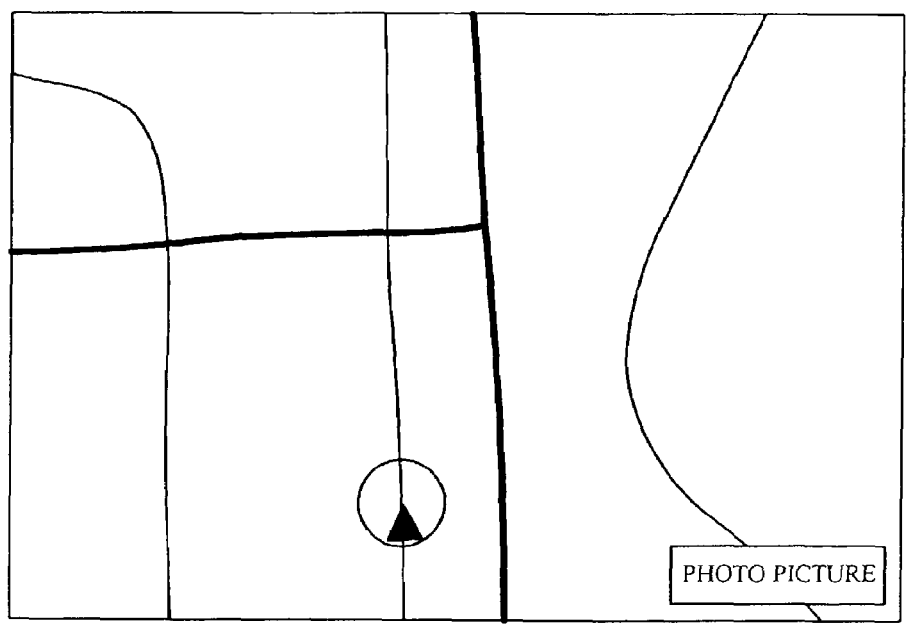

Then, it is judged in Step S5 whether or not a flag $f_1$ is 1 showing that the screen which is displayed on the display panel 9b was switched from a map picture to a photo picture. When it is judged that the flag $f_1$ is not 1, i.e., that the screen is not switched to a photo picture, it is judged in Step S6 whether or not a flag $f_2$ is 1 showing that display switching to a photo picture is possible (or that one's car is within the recorded areas). When the flag $f_2$ is judged not to be 1, a "PHOTO PICTURE" button switch (touch switch) for a user's command to conduct the display switching from a map picture to a photo picture is formed (Step S7). Then, the flag $f_2$ is changed to 1 (Step S8), and the operation goes to Step S9. FIGS. 4(a) and 4(b) are illustrations showing a state where a map picture is displayed on the display panel 9b, and in FIG. 4(b), the "PHOTO PICTURE" button switch is displayed on the map picture.

On the other hand, when it is judged in Step S6 that the flag $f_2$ is 1, or that the "PHOTO PICTURE" button switch has been already formed, the operation bypasses Steps S7 and S8, and proceeds directly to Step S9.

In Step S9, it is judged whether or not the "PHOTO PICTURE" button switch was touched by the user. When the "PHOTO PICTURE" button switch is judged to have been touched, the "PHOTO PICTURE" button switch is cleared (Step S10), and the flag $f_2$ is changed to 0 (Step S11). Then, as a photo picture (such as a photo picture of a wide-area display) showing the periphery of the current position of one's car is displayed, a car position mark showing the current position one's car is displayed on the photo picture (Step S12). Here, as a method for displaying the car position mark on the photo picture, a method wherein the latitudes and longitudes of the upper left and lower right points of the rectangular area shown by the photo data are used is exemplified.

Figure 5:
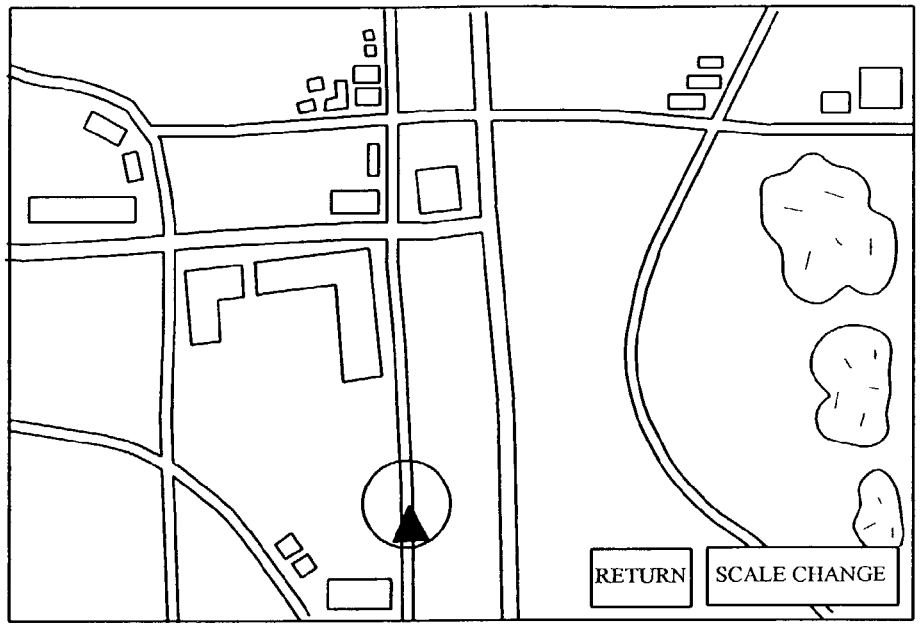
FIG. 5 is an illustration showing a state where a photo picture is displayed on the display panel.

After the processing in Step S12, a "RETURN" button switch for the user's command to change back the display from the photo picture to the map picture and a "SCALE CHANGE" button switch for the user's command to change the reduced scale of the photo picture are additionally formed (Steps S13 and S14), and then, the flag $f_1$ is changed to 1 (Step S15). In FIG. 5, a state where a photo picture is displayed on the display panel 9b is shown.

On the other hand, when the "PHOTO PICTURE" button switch is judged not to have been touched in Step S9, the map picture is updated based on the current position information of one's car (Step S16).

By the way, when it is judged that the flag $f_1$ is 1, or that the display has been switched to a photo picture in Step 5, it is judged in Step S17 whether the "RETURN" button switch was touched or not. When the "RETURN" button switch is judged to have been touched, the "RETURN" button switch and the "SCALE CHANGE" button switch are cleared from the screen (Steps S18 and S19), and then, the flag $f_1$ is changed to 0 (Step S20).

After that, a map picture showing the periphery of the current position of one's car is displayed (Step S21), the "PHOTO PICTURE" button switch is formed (Step S22), and then, the flag $f_2$ is changed to 1 (Step S23).

Figure 6:
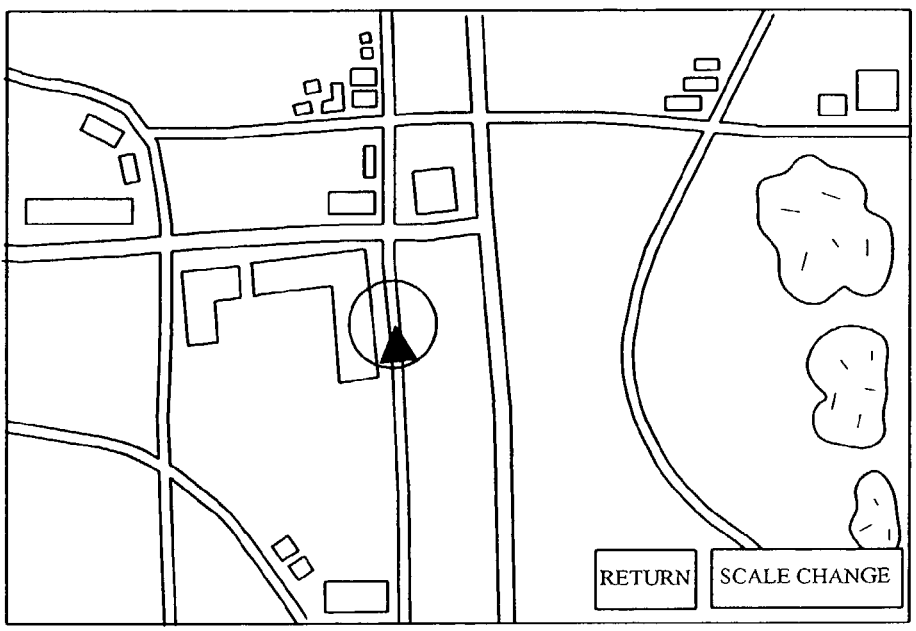
FIG. 6 is an illustration showing a state where a position mark of one's car appearing on the photo picture was updated.

On the other hand, when the "RETURN" button switch is judged not to have been touched in Step S17, it is judged in Step S24 whether the "SCALE CHANGE" button switch was touched or not. When the "SCALE CHANGE" button switch is judged to have been touched, the reduced scale of the photo picture is changed (Step S25), and, based on the current position information of one's car, the car position mark appearing on the photo picture is updated (Step S26). A state where the car position mark appearing on a photo picture was updated is shown in FIG. 6.

Here, the changing of the reduced scales of photo pictures is conducted, for example, by reading data regarding a photo picture of a detailed display from the buffer memory 18 so as to display a photo picture of a detailed display in the case where a photo picture of a wide-area display appears, while reading data regarding a photo picture of a wide-area display from the buffer memory 18 so as to display a photo picture of a wide-area display in the case where a photo picture of a detailed display appears.

When the "SCALE CHANGE" button switch is judged not to have been touched in Step S24, it is not necessary to change the reduced scale of the photo picture, and thus the operation bypasses Step S25 and proceeds to Step S26, wherein, based on the current position information of one's car, the car position mark appearing on the photo picture is updated.

By the way, when one's car is judged not to be within the recorded areas in Step S3, it is judged in Step S3 whether or not the flag $f_1$ is 1 showing that the display was switched from the map picture to the photo picture. When it is judged that the flag $f_1$ is not 1, or that the map picture is displayed, it is judged in Step S32 whether or not the flag $f_2$ is 1 showing that the display changing to a photo picture is possible (or that one's car is within the recorded areas).

When it is judged that the flag $f_2$ is 1, or that the "PHOTO PICTURE" button switch has been formed, the "PHOTO PICTURE" button switch is cleared (Step S33), and then, the flag $f_2$ is changed to 0 (Step S34).

On the other hand, when the flag $f_2$ is judged not to be 1 in Step 32, it is not necessary to conduct the processing operation in Steps S33 and S34, and thus the processing operation ① is ended at once.

When it is judged that the flag $f_1$ is 1, or that a photo picture is displayed in Step 31, it is judged in Step S35 whether the "RETURN" button switch was touched by the user or not. When the "RETURN" button switch is judged to have been touched, the "RETURN" button switch and the "SCALE CHANGE" button switch are cleared (Steps S36 and S37), and the flag $f_1$ is changed to 0 (Step S38). Then, a map picture showing the periphery of the current position of one's car is displayed (Step S39).

On the other hand, when the "RETURN" button switch is judged not to have been touched in Step S35, it is not necessary to return the display to a map picture, and thus the processing operation ① is ended at once.

By using the navigation system in which the image display according to the first embodiment is adopted, when one's car goes into an area whose photo data is recorded (e.g. a major city such as Tokyo or Osaka), a "PHOTO PICTURE" button switch is displayed, and therefore, the user can easily know that he/she has been in an area where photo pictures can be displayed.

When the "PHOTO PICTURE" button switch is touched by the user, the display is switched from a map picture to a photo picture showing the periphery of the current position of the user's car. Therefore, by seeing the photo picture, the user can easily know the current position of the user's car, and the user can easily grasp the actual situation around the current position of his or her car.

In the navigation system in which the image display according to the first embodiment is adopted, the user is taught (informed) that he/she has entered an area where photo pictures can be displayed by displaying the "PHOTO PICTURE" button switch, and by the user's touch of the "PHOTO PICTURE" button switch, the display switching is conducted. However, in an image display according to another embodiment, the user may be taught that he/she has entered an area where photo pictures can be displayed by changing the shape or color of one's car position mark, and by the user's touch of the car position mark whose shape or color has changed, the display switching may be conducted.

Here, only the case where a map picture is completely switched to a photo picture is described, but when the photo picture is displayed, the display space of the map picture may be made smaller and the photo picture may be displayed in the unoccupied space, or the photo picture may be overlaid on the map picture for display.

In the navigation system in which the image display according to the first embodiment is adopted, a photo picture is displayed according to the user's command for switching, but in a navigation system according to another embodiment, when one's car enters the recorded area, a photo picture showing the periphery of the current position of one's own car may be automatically displayed. Here, in this case, a method wherein a map picture is completely switched to a photo picture may be allowed, but a method wherein the display space for a map picture is made smaller and a photo picture is displayed in the available space is more desirable.

In the navigation system in which the image display according to the first embodiment is adopted, in consideration of photo data, having a considerably large amount of data, whereby it takes a considerably greater time to read photo data from a storage device or process images, the DVD-ROM 17 in which photo data of two types of different scales to one area is recorded is adopted. However, if it becomes possible to conduct the image processing and the like on photo data at high speeds, a recording medium in which photo data of two or more types is recorded is not adopted, but a recording medium in which photo data of one type of a smaller scale (e.g. a scale of 1 m per pixel, or detailed image data) is recorded may instead be adopted.

Second Embodiment

A navigation system in which an image display according to a second an embodiment of the present invention is adopted will now described below. Here, since the construction of the navigation system in which the image display according to the second embodiment is adopted is similar to that of the navigation system shown in FIG. 1 except for the microcomputer 1, a microcomputer is marked differently and the other constituent elements are not described below.

Figure 7:
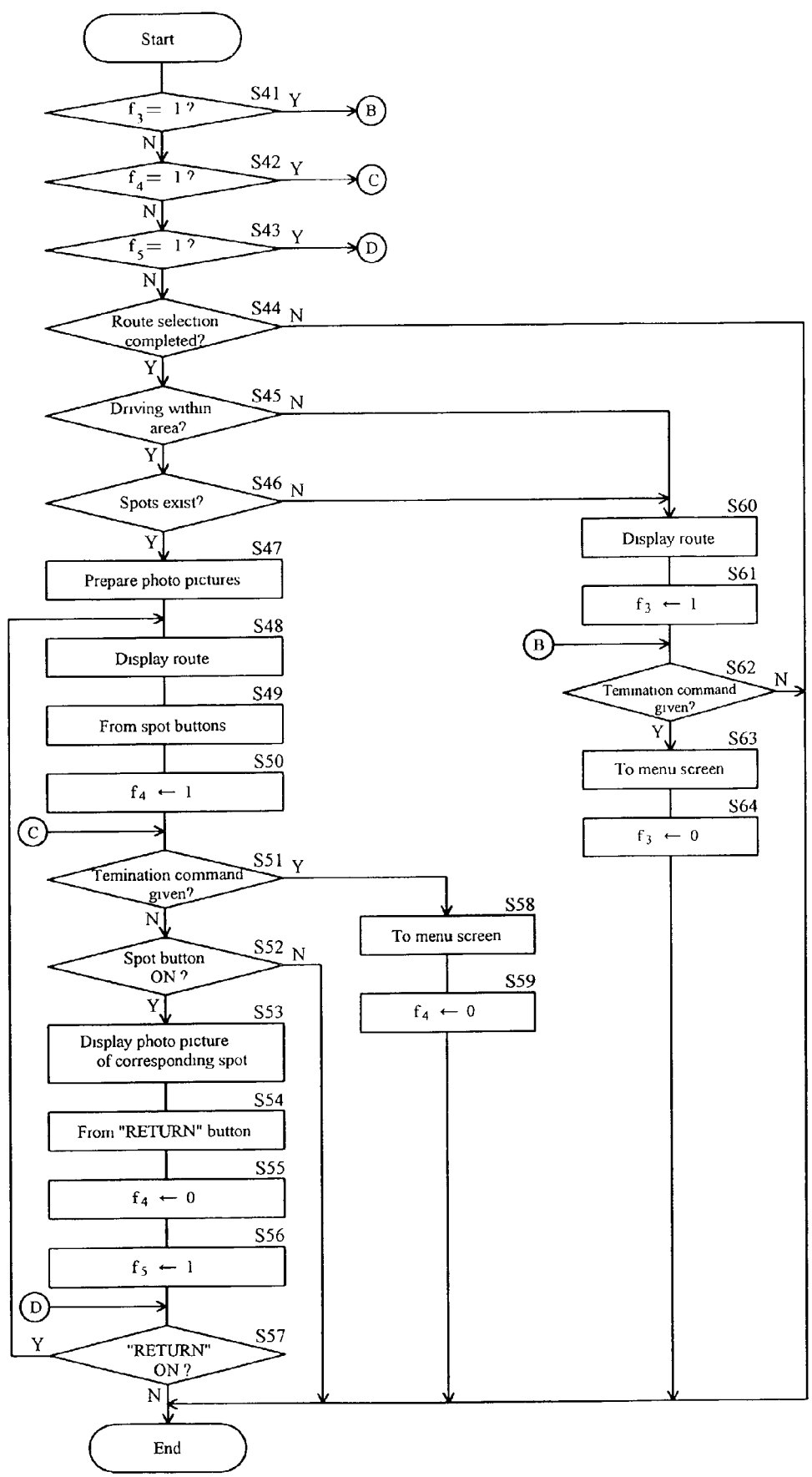
FIG. 7 is a flowchart showing the processing operation which is performed by a microcomputer in a navigation system in which an image display according to a second embodiment of the present invention is adopted.

The processing operation ② which is performed by the microcomputer 11A in the navigation system in which the image display according to the second embodiment is adopted is described below by reference to a flowchart shown in FIG. 7. First, in Steps S41-43, it is judged whether the below-described flags $f_3$-$f_5$ are 1 or not. When the flags $f_3$-$f_5$ each are judged not to be 1, the operation goes to Step S44, wherein it is judged whether or not the selection of a route was completed with entries of a goal and the like by the user.

When the selection of a route is judged not to have been completed, the processing operation ② is ended at once. On the other hand, when the selection of a route is judged to have been completed, it is judged in Step S45 whether or not the selected route runs within a recorded area (such as a major city) of photo data that is recorded in a DVD-ROM 17. When the selected route is judged to run within the recorded area, it is judged in Step S46 whether or not prescribed spots (such as interchanges and tourist spots) exist on or around the selected route.

When the prescribed spots are judged to exist on or around the selected route, required photo data (or photo data regarding the prescribed spots existing on or around the selected route) is read from the DVD-ROM 17, and, based on the read photo data, photo pictures showing the prescribed spots are prepared (Step S47). Here, the data regarding the photo pictures showing the prescribed spots is stored in a buffer memory 18.

Then, the route is displayed on the screen (Step S48), button switches for the user's commands to display photo pictures showing the prescribed spots are formed so as to correspond to the locations of the spots (Step S49), and the flag $f_4$ showing that the button switches are formed is changed to 1 (Step S50). A state where the button switches are displayed on a map is shown in FIG. 8.

Figure 8:
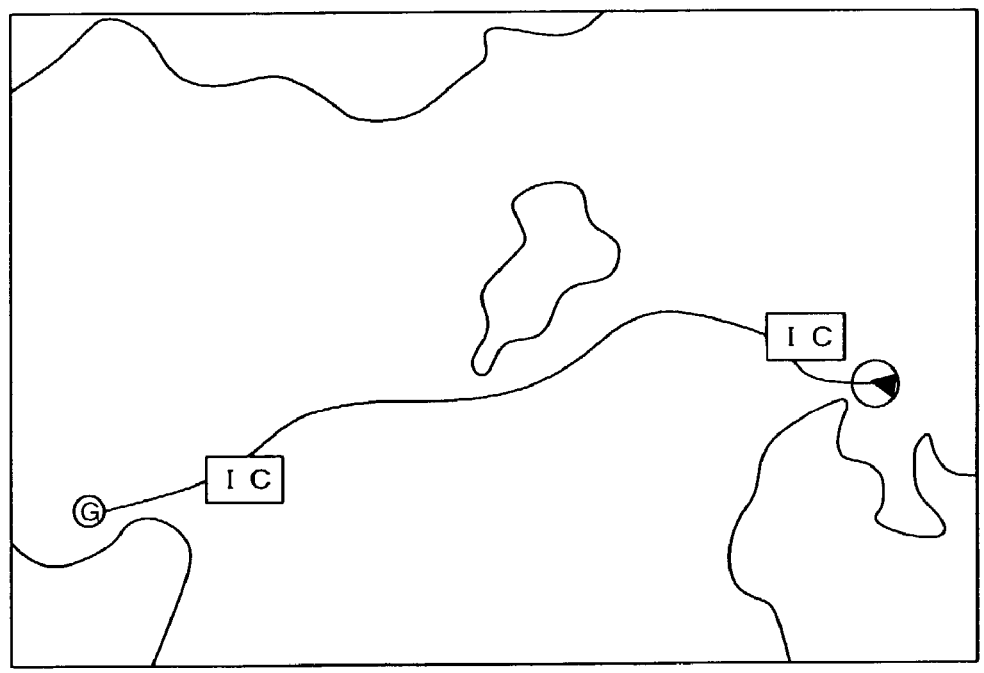
FIG. 8 is an illustration showing a state where button switches for selecting spots appear on a map.

Here, as for the button switches, how to represent each kind of spots is previously determined as shown in FIG. 8. For example, an interchange is determined to be represented by an "IC" and a service area may be determined to be represented by a "SA", so that the user can easily select a spot he/she desires.

It is judged in Step S51 whether or not a termination command of the route display was given through operation of a remote control 8 or the like. When the termination command of the route display is judged not to have been given by the user, it is judged in Step S52 whether or not a button switch such as an "IC" appearing on the screen was touched.

When the button switches are judged not to have been touched, the processing operation ② is ended at once. On the other hand, when a button switch is judged to have been touched, a photo picture showing a spot corresponding to the touched button switch is displayed (Step S53), a "RETURN" button switch for the user's command to return the display to the picture in which the route is shown is formed (Step S54), the flag $f_4$ is changed to 0 (Step S55), and then, the flag $f_5$ showing that a photo picture showing a spot is displayed is changed to 1 (Step S56).

It is judged in Step S57 whether or not the "RETURN" button switch was touched by the user. When the "RETURN" button switch is judged to have been touched, the operation returns to Step S48, wherein the route is displayed. On the other hand, when the "RETURN" button switch is judged not to have been touched, the processing operation ② is ended at once.

When the termination command of the route display is judged to have been given by the user in Step S51, a menu screen is displayed (Step S58), and the flag $f_4$ is changed to 0 (Step S59).

When the selected route is judged not to run within the recorded areas in Step S45, or when the prescribed spots are judged not to exist on or around the selected route in Step S46, the operation proceeds to Step S60, wherein the route is displayed, and the flag $f_3$ showing that the route display is conducted in the same manner as before is changed to 1 (Step S61).

It is judged in Step S62 whether or not a command to terminate the route display was given through operation of the remote control 8 or the like. When the command to terminate the route display is judged to have been given by the user, the menu screen is displayed (Step S63), and the flag $f_3$ is changed to 0 (Step S64). On the other hand, when the termination command is judged not to have been given, the processing operation ② is ended at once.

When it is judged that the flag $f_3$ is 1, or that the route is displayed in the same manner as before in Step S41, the operation proceeds to Step S62. When it is judged that the flag $f_4$ is 1, or that button switches for commands to display photo pictures showing spots have appeared in Step S42, the operation proceeds to Step 51, wherein it is judged whether or not a command to terminate the route display was given by the user.

When it is judged that the flag $f_5$ is 1, or that a photo picture showing a spot has appeared in Step S43, the operation proceeds to Step S57, wherein it is judged whether or not the "RETURN" button switch was touched.

By using the navigation system in which the image display according to the second embodiment is adopted, photo pictures showing prescribed spots (such as interchanges, service areas and tourist spots) existing on or around the selected route are displayed. As a result, places which are difficult to express on a map picture can be shown by using photo pictures, and therefore, the user can easily know such places. In addition, by using photo pictures showing tourist spots and the like having a lot of good points that are worth seeing can make a drive and the like more enjoyable.

Since the button switches for commands to display the photo pictures are formed so as to correspond to each spot, the user can easily select a spot he/she desires.

Third Embodiment

A navigation system in which an image display according to a third embodiment of the present invention is adopted will now be described below. Here, since the construction of the navigation system in which the image display according to the third embodiment is adopted is similar to that of the navigation system shown in FIG. 1 except for the microcomputer 11 and the DVD-ROM 17, a microcomputer and a DVD-ROM are marked differently and the other constituent elements are not described below.

In the DVD-ROM 17B, electronic map data covering, for instance, an entire country, photo data such as satellite photographs or air photographs showing the surface of the earth, and detailed data (e.g. data regarding admission fees, business days and the like) regarding prescribed spots (e.g. places of amusement and restaurants) are recorded. Here, the recorded areas (such as the major cities) concerning the photo data are limited.

Figure 9:
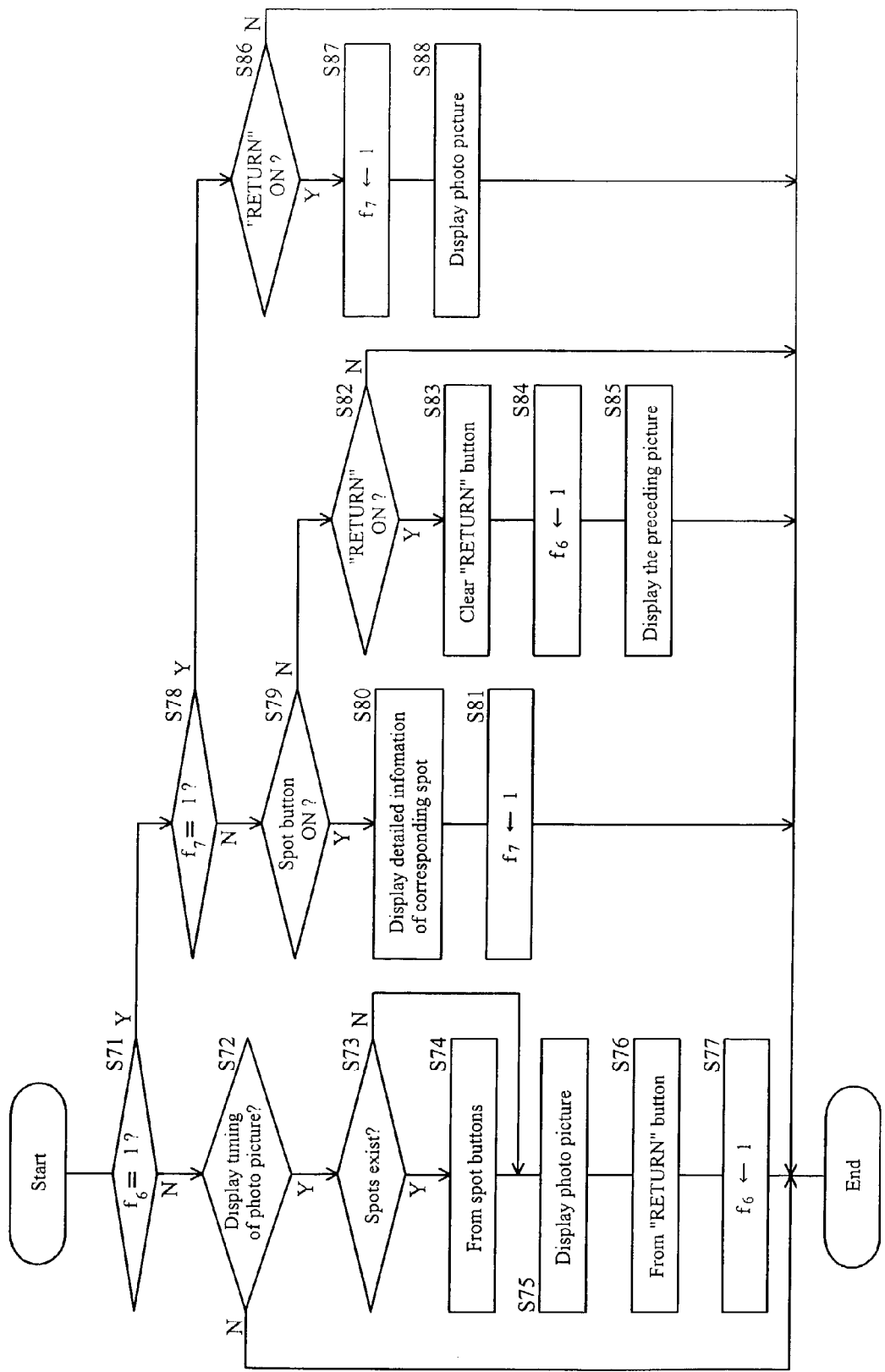
FIG. 9 is a flowchart showing the processing operation which is performed by a microcomputer in a navigation system in which an image display according to a third embodiment of the present invention is adopted.

The processing operation ③ which is performed by the microcomputer 11B in the navigation system in which the image display according to the third embodiment is adopted is described below with reference to a flowchart shown in FIG. 9. First, it is judged in Step S71 whether or not a flag $f_6$ is 1 showing that a photo picture is displayed. When it is judged that the flag $f_6$ is not 1, or that a photo picture is not displayed, it is judged in Step S72 whether or not it is the display timing of a photo picture (e.g. in a case where a command for display switching to a photo picture was given by a user).

When it is judged not to be the display timing of a photo picture, the processing operation ③ is ended at once, while when it is judged to be the display timing of a photo picture, it is judged in Step S73 whether or not prescribed spots (e.g. places of amusement and restaurants) whose detailed data is recorded exist within the area shown by a photo picture to be displayed.

When the prescribed spots are judged to exist therein, button switches for commands to provide detailed information regarding the prescribed spots are formed so as to correspond to each spot (Step S74), while the photo picture is displayed (Step S75), a "RETURN" button switch for the user's command to return the display from the photo picture to the preceding picture is formed (Step S76), and the flag $f_6$ is changed to 1 (Step S77).

On the other hand, when it is judged in Step S73 that the prescribed spots do not exist therein, the operation bypasses Step S74, and proceeds to Step S75.

By the way, when it is judged that the flag $f_6$ is 1, or that a photo picture is displayed in Step S71, it is judged in Step S78 whether or not a flag $f_7$ is 1 showing that detailed information regarding a spot is displayed. When it is judged that the flag $f_7$ is not 1, or that the detailed information is not displayed, it is judged in Step S79 whether or not a button switch that is formed so as to correspond to each spot was touched.

When the button switch is judged to have been touched, detailed data regarding the corresponding spot is read out and, based on the read detailed data, detailed information regarding the spot is displayed (Step S80), and the flag $f_7$ is changed to 1 (Step S81).

On the other hand, when the button switches are judged to have not been touched in Step S79, it is judged in Step S82 whether or not the "RETURN" button switch was touched. When the "RETURN" button switch is judged to have been touched by the user, the "RETURN" button switch is cleared (Step S83), the flag $f_6$ is changed to 0 (Step S84), and the picture preceding the photo picture is displayed (Step S85). On the other hand, when the "RETURN" button switch is judged to have not been touched, the processing operation ③ is ended at once.

When it is judged that the flag $f_7$ is 1, or that the detailed information has appeared in Step S78, it is judged in Step S86 whether or not the "RETURN" button switch was touched by the user. When the "RETURN" button switch is judged to have been touched, the flag $f_7$ is changed to 0 (Step S87), and the photo picture is displayed (Step S88). On the other hand, when the "RETURN" button switch is judged to have not been touched, the processing operation ③ is ended at once.

By using the navigation system in which the image display according to the third embodiment is adopted, detailed information (e.g. information regarding admission fees, business days and the like) regarding spots (e.g. places of amusement and restaurants) which exist within the area that is shown by a displayed photo picture is provided to the user, and therefore, an image display unit which gives higher satisfaction to the user can be realized.

In addition, since button switches for commands to provide the detailed information are formed so as to correspond to each spot, the user can easily select a spot that he/she desires.

Fourth Embodiment

A navigation system in which an image display according to a fourth embodiment of the present invention is adopted will now be described below. Here, since the construction of the navigation system in which the image display according to the fourth embodiment is adopted is similar to that of the navigation system shown in FIG. 1 except for the microcomputer 11, a microcomputer is marked differently and the other constituent elements are not described below.

Figure 10:
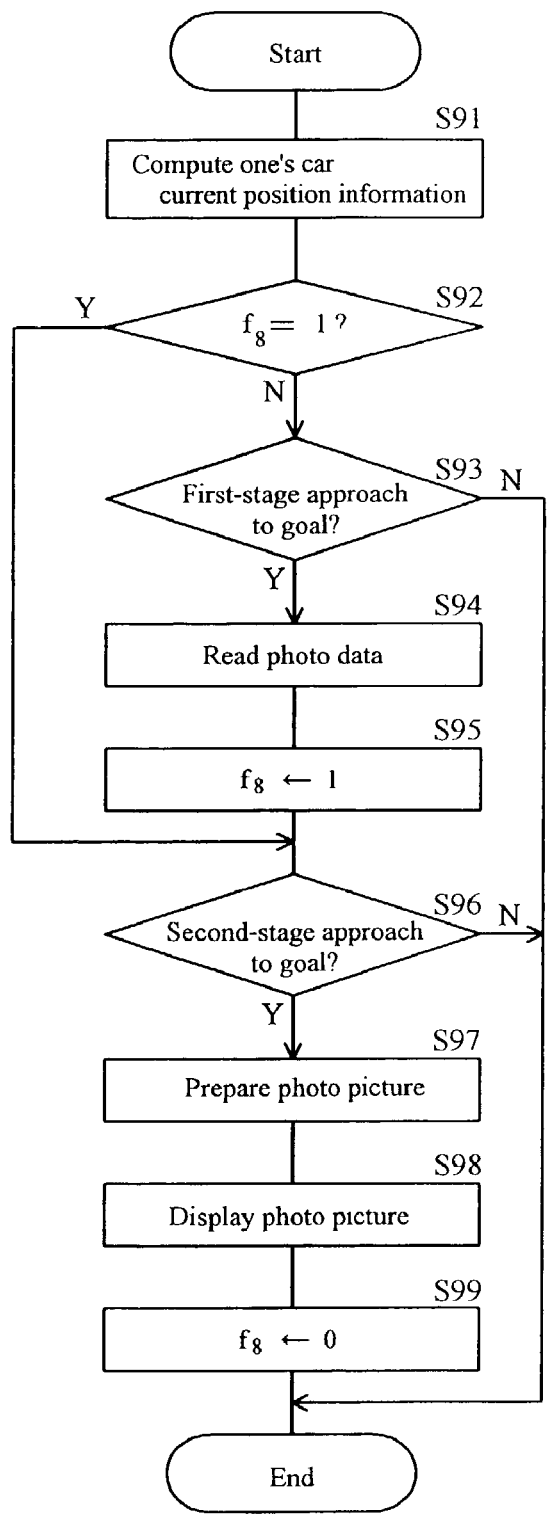
FIG. 10 is a flowchart showing the processing operation which is performed by a microcomputer in a navigation system in which an image display according to a fourth embodiment of the present invention is adopted.
Figure 11A:
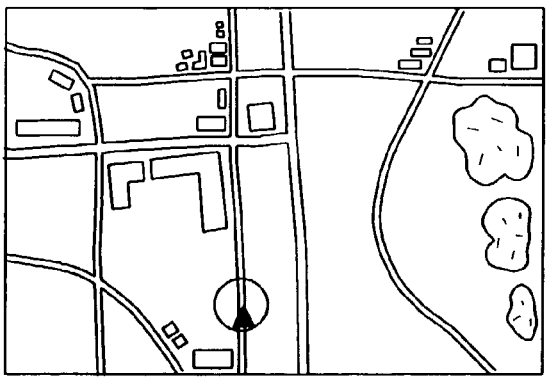
FIGS. 11(a)-11(h) are illustrations showing a state where a photo picture display is shifting to a map picture display.
Figure 11B:
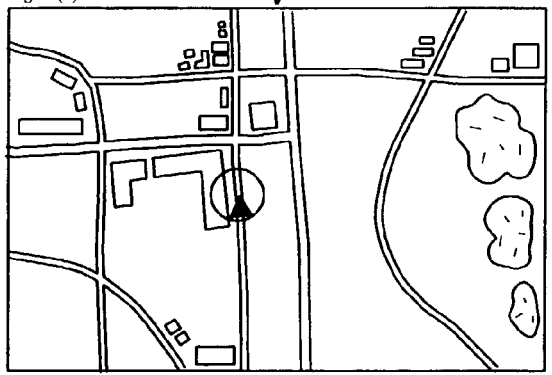
Figure 11C:
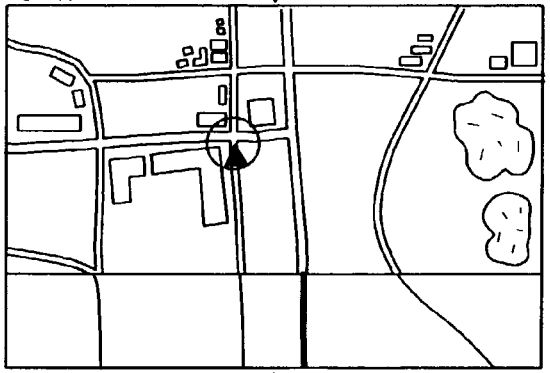
Figure 11D:
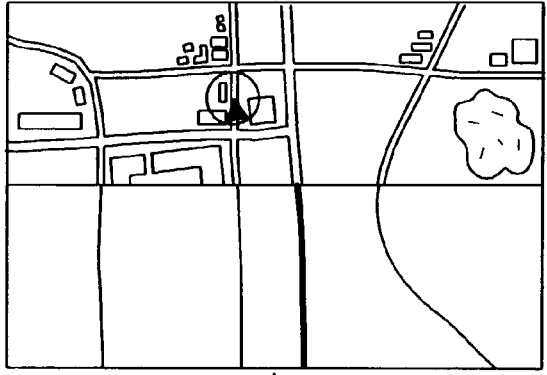
Figure 11E:
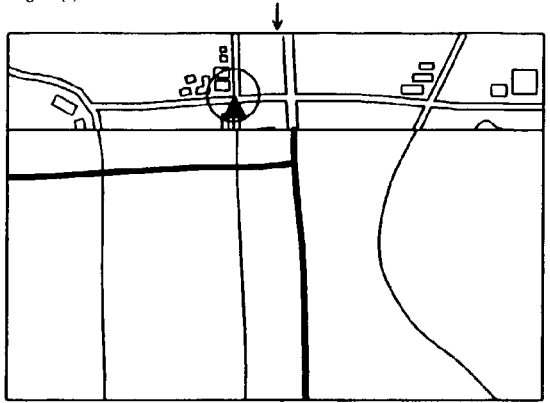
Figure 11F:
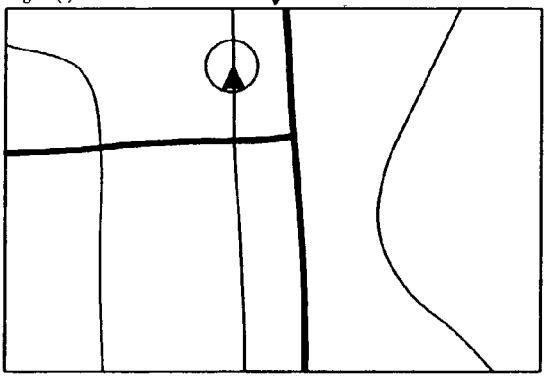
Figure 11G:
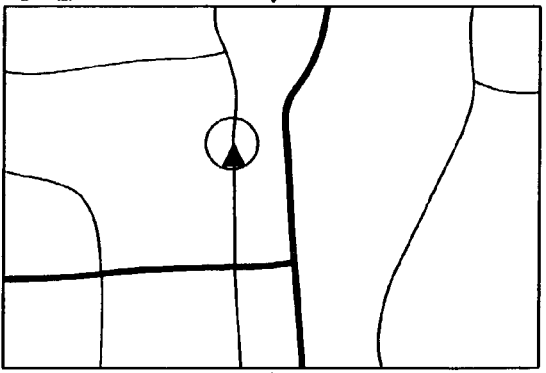
Figure 11H:
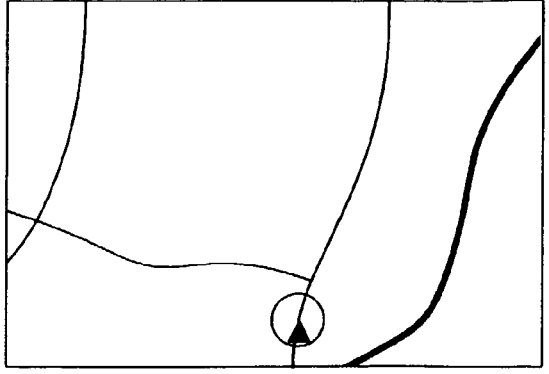

The processing operation ④ which is performed by the microcomputer 11C in the navigation system in which the image display according to the fourth embodiment is adopted is described below with reference to a flowchart shown in FIG. 10. First, the current position of one's car is computed from GPS signals and the like (Step S91), and it is judged in Step S92 whether or not a flag $f_8$ is 1 showing that photo data regarding the periphery of a goal was read form the DVD-ROM 17.

When it is judged that the flag $f_8$ is not 1, or that the photo data has not been read out, it is judged in Step S93 whether or not one's car can reach the goal within 10 minutes based on the computed current position information of one's car. When the car is judged not to be able to reach the goal within 10 minutes, the processing operation ④ is ended at once. On the other hand, when the car is judged to be able to reach the goal within 10 minutes, photo data regarding the periphery of the goal is read from the DVD-ROM 17 and the microcomputer 11C stores the same in a buffer memory 18 (Step S94), the flag $f_8$ is changed to 1 (Step S95), and the operation proceeds to Step S96.

When it is judged that the flag $f_8$ is 1, or that the photo data has already been read out in Step S92, the operation bypasses Steps S93-95, and proceeds directly to Step S96.

In Step S96, based on current position information of one's car, it is judged whether or not the car can reach the goal within 3 minutes. When the car is judged not to be able to reach the goal within 3 minutes, the processing operation ④ is ended at once. On the other hand, when the car is judged to be able to reach the goal within 3 minutes, based on the photo data regarding the periphery of the goal that is stored in the buffer memory 18, a photo picture showing the periphery of the goal is prepared (Step S97), the prepared photo picture is displayed (Step S98), and the flag $f_8$ is changed to 0 (Step S99).

By using the navigation system in which the image display according to the fourth embodiment is adopted, since a photo picture showing the periphery of a goal is displayed, the user can obtain such various kinds of information regarding the goal such as information about whether the goal is in the midtown or not, information about whether the road is wide or narrow, information about whether the area is densely built-up or not and information about whether places of amusement or parking spaces exist.

In addition, since a photo picture showing the periphery of the goal is displayed when one's car reaches close to the goal, the user can grasp the situation around the goal just before arriving at the goal.

Here, in the navigation system in which the image display according to the fourth embodiment is adopted, a photo picture showing the periphery of the goal is displayed when one's car reaches close to the goal. However, in a navigation system according to another embodiment, the photo picture may be displayed when the goal was selected by the user, or the photo picture may be displayed when a display command was given by the user.

A map picture, a photo picture, a screen showing detailed information and the like to be displayed on the display panel 9b in the navigation system in which the image display according to any one of the first through fourth embodiments is adopted, may be displayed on the same screen, which enables the user to efficiently grasp information that is acquired from various kinds of pictures. When various kinds of pictures are displayed on the same screen, the differentiation of the display spaces and the like may be prepared according to the importance, the user's command or the like.

In the navigation system in which the image display according to any one of the first through fourth embodiments is adopted, by conducting the display switching from a map picture to a photo picture and/or the display switching from the photo picture to the map picture by matching the area shown by the map picture with the area shown by the photo picture (matching the reduced scales, directions and locations of both the pictures), the display switching can be performed without giving an unnatural feeling to the user.

Furthermore, by conducting the display switching with the image processing of a fade-in and/or a fade-out (e.g. the transmittance of the screen display is variable in the 100% to 0% range), a very excellent visual display switching can be achieved. Here, as a method for matching the reduced scales, directions and locations of both the pictures, matching the latitudes and longitudes of the upper left and lower right points of the rectangular area that is shown by map data with those of the rectangular area shown by photo data is exemplified.

By the way, photo data has a considerably large amount of data, as compared with map data, and thus it sometimes may take a considerably greater time to read photo data from a storage device or process images. Therefore, it is difficult, for example, to update a picture according to one's travel by fixing one's current position mark on the display, similar to the case of using map data.

As one of methods for solving this problem, a method wherein, with the photo picture fixed on the display panel 9b, one's current position mark is caused to move on the photo picture as shown in FIGS. 5 and 6 is exemplified. However, the photo picture is not updated according to one's travel, and therefore, one's current position mark will be the last to exit out of the photo picture (or the display panel 9b).

As a method for avoiding the occurrence of such a situation, a method is exemplified in which, in the case of display switching from the photo picture to the map picture, by matching the area that is shown by the map picture with the area that is shown by the photo picture, according to the travel of one's car, the display area of the photo picture is made smaller while the display area of the map picture is made larger, and the display is gradually switched so that the current position mark of one's car shifts onto the map picture before the current position mark of one's care exits out of the photo picture (the display panel 9b), as shown in FIGS. 11(a)-11(h), which thereby makes it possible to avoid the occurrence of the above situation, and also enables a very excellent visual display switching.

In the navigation system in which the image display according to any one of the first through fourth embodiments is adopted, by reading photo data based on a predetermined condition (such as photo data taken in winter) from a recording medium in which photo data that is taken in two or more situations (such as seasons or time periods) of one area and displaying a photo picture that is prepared based on the read photo data, for example, a photo picture (such as the situation of a snowy urban area) that is prepared based on photo data taken in the winter in the case of December can be displayed, thereby leading to a realization of a navigation system having higher added values.

In the navigation system in which the image display according to any one of the first through fourth embodiments is adopted, by displaying a photo picture on which a preset image processing (e.g. filtering) is conducted based on a predetermined condition (such as time periods), for example, a night photo picture can be displayed after sunset, thereby leading to a realization of a system which gives the user a high satisfaction.

Fifth Embodiment

Figure 12:
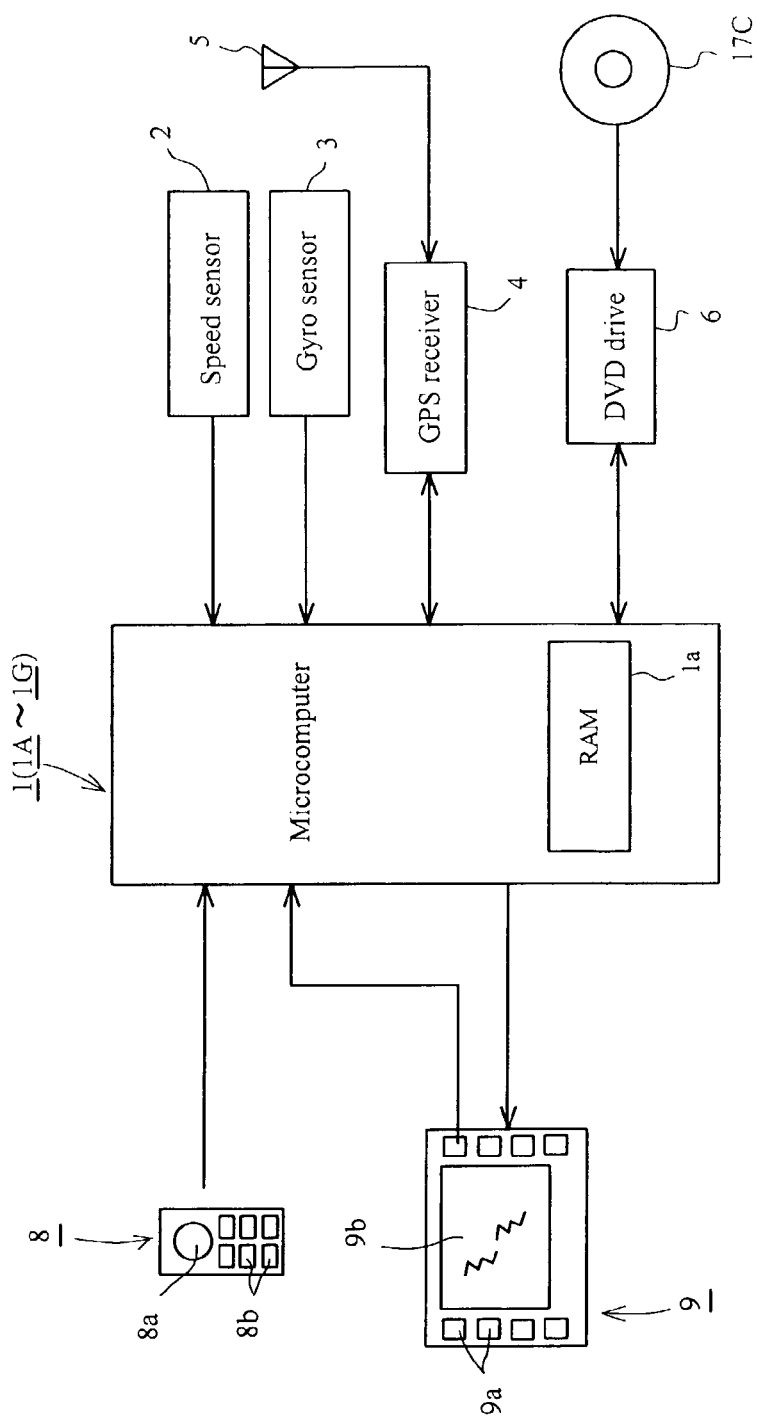
FIG. 12 is a block diagram schematically showing the principal part of a navigation system in which an image display according to a fifth embodiment of the present invention is adopted.

FIG. 12 is a block diagram schematically showing the principal part of a navigation system in which an image display according to a fifth embodiment of the present invention is adopted.

A speed sensor 2 for acquiring information regarding the distance in which one's vehicle (car) travels by computing the vehicle speed and a gyro sensor 3 for acquiring information regarding the direction in which one's vehicle is headed are connected to a microcomputer 1, which concludes the position of one's car based on the computed distance information in which the vehicle has traveled and the direction information in which the vehicle is heading (self-contained navigation).

A GPS receiver 4, which receives GPS signals from satellites through an antenna 5, is connected to the microcomputer 1, which concludes the position of one's car based on the received GPS signals (GPS navigation).

A DVD drive 6, which can capture map data or real image data from a DVD-ROM 17C (other storage devices are also allowed) in which the map data and the real image data of satellite photographs showing the surface of the earth are recorded, is connected to the microcomputer 1, which, based on the concluded current position information of one's car, route information regarding the below-described guidance route and the like, stores the map data or the real image data acquired from the DVD-ROM 17C into a RAM 1a within the microcomputer 1. Here, as a method for allowing the real image data to correspond to the position coordinates, a method is exemplified wherein the latitudes and longitudes of the upper left and lower right points of the rectangular area that is shown by the real image data are used.

By conducting the map-matching wherein the concluded current position of one's car and the map data (the real image data) are matched, the microcomputer 1 can display a map image (real image) in which the current position of one's car is precisely shown on a display panel 9b.

Further, switch signals that are output from a joystick 8a or button switches 8b which are arranged on a remote control 8, or switch signals that are output from button switches 9a which are arranged on a monitor 9 are input to the microcomputer 1, in which the processing corresponding to these switch signals is conducted. For example, when capturing information of a goal or transit points from these switches, the microcomputer 1 finds an optimum route from the current position of one's car (starting point) to the goal via the transit points and displays the optimum route as a guidance route with a map picture on the display panel 9b.

At the top, bottom and both sides of the display panel 9b, multiple infrared LEDs and multiple phototransistors are arranged in opposed positions to each other, so that the locations where a finger touches the display panel 9b can be detected. The detected results can be acquired by the microcomputer 1.

Figure 13:
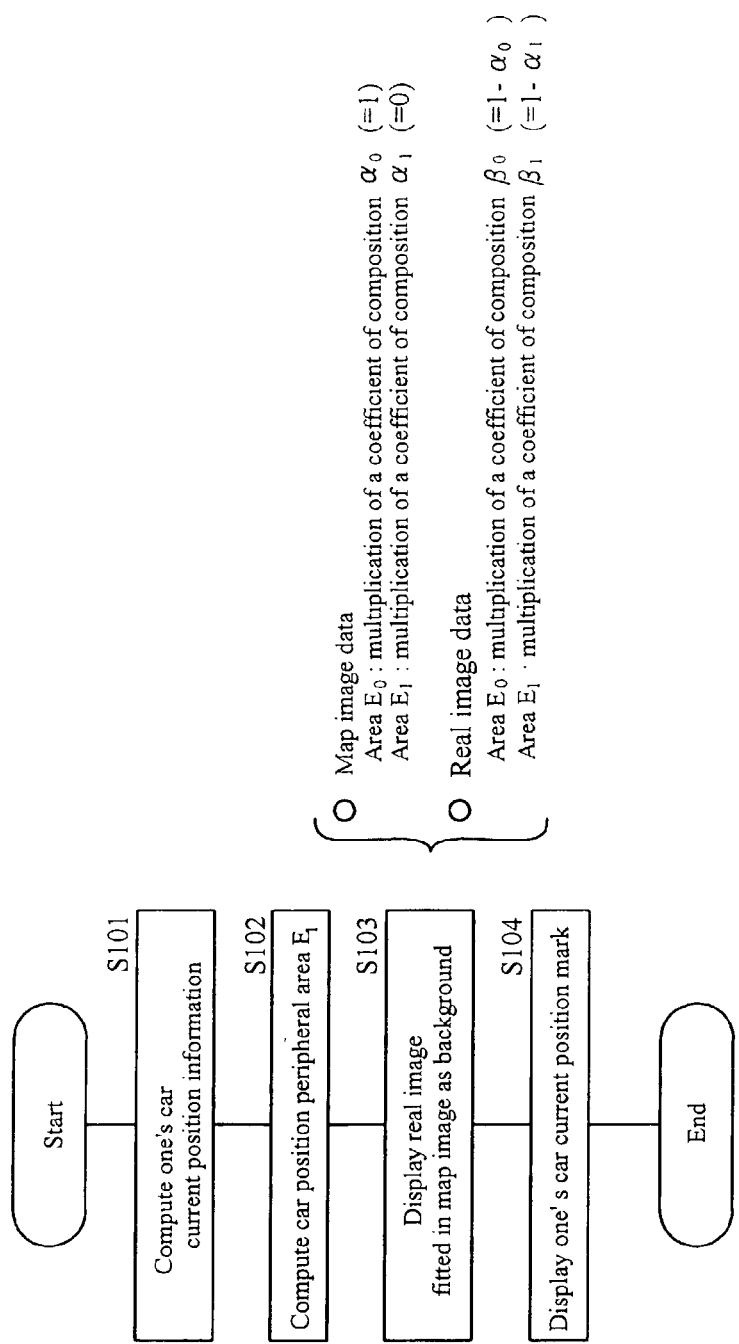
FIG. 13 is a flowchart showing the processing operation which is performed by a microcomputer in the navigation system in which the image display according to the fifth embodiment is adopted.

The processing operation ① which is performed by the microcomputer 1 in the navigation system in which the image display according to the fifth embodiment is adopted will now be described below with reference to a flowchart shown in FIG. 13. First, the current position of one's car is computed from the GPS signals and the like (Step S101), and, based on the computed current position information of one's car, an area $E_1$ around the current position of one's car, for example, an area up to some hundreds of radius from the current position of one's car in the center, is computed (Step S102), and, based on the map data and the real image data stored in the RAM 1a, regarding a region including the current position of one's car, a map image is displayed as a background on the display panel 9b and a real image in the same scale as the map image is displayed in the area $E_1$ (Step S103), and then, a mark M showing the current position of one's car is displayed on the display panel 9b (Step S104).

Here, the processing operation in Step 103 is described in more detail. In the case of displaying a map image corresponding to the map data in the remaining region other than the area $E_1$ (an area $E_0$), the microcomputer 1 multiplies the map data by a coefficient of composition $\alpha_0$ (=1), while in the case of displaying the map image in the area $E_1$, the microcomputer 1 multiplies the map data by a coefficient of composition $\alpha_1$ (=0).

In the case of displaying a real image corresponding to the real image data in the area $E_0$, the microcomputer 1 multiplies the real image data by a coefficient of composition $\beta_0$ (=1−$\alpha_0$, or 0), while in the case of displaying the real image in the area $E_1$, the microcomputer 1 multiplies the real image data by a coefficient of composition $\beta_1$ (=1−$\alpha_1$, or 1).

Figure 14:
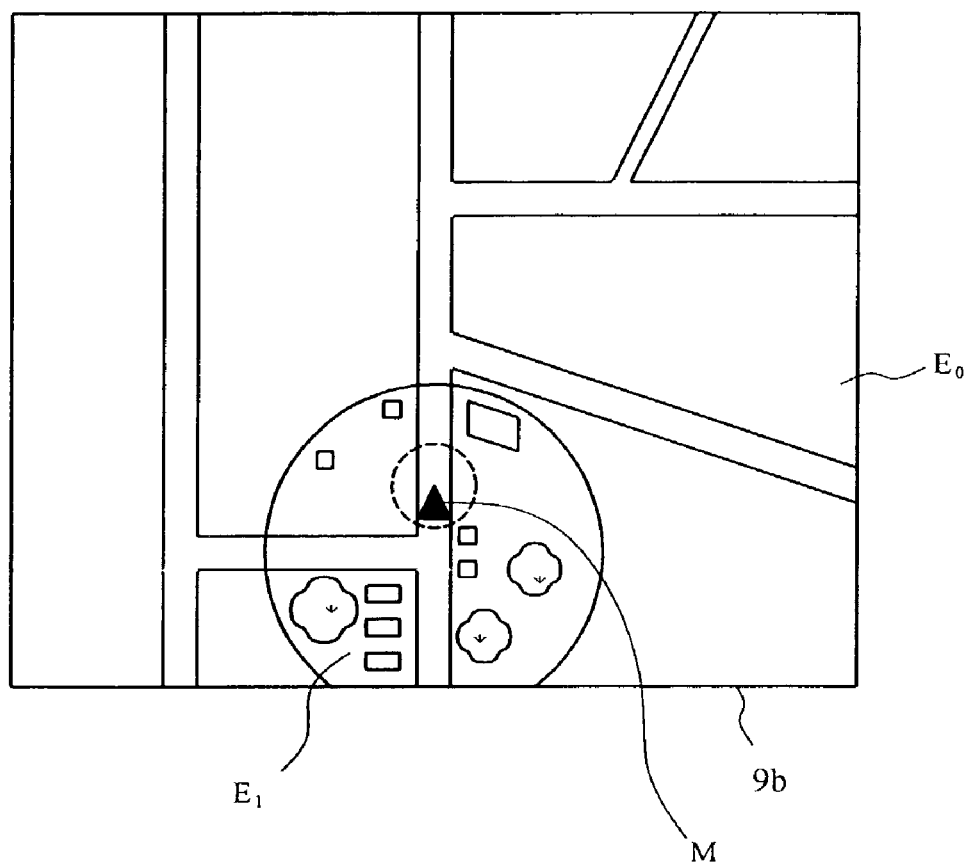
FIG. 14 is an illustration showing an example of a screen state that is displayed on a display panel of the navigation system in which the image display according to the fifth embodiment is adopted.

That is, since the coefficient of composition $\alpha_0$ is 1 (the coefficient of composition $\beta_0$ is 0), only the map image is displayed in the area $E_0$. Since the coefficient of composition $\alpha_1$ is 0 (the coefficient of composition $\beta_1$ is 1), only the real image is displayed in the area $E_1$. A state where the map image is displayed in the area $E_0$ and where the real image is displayed in the area $E_1$ is shown in FIG. 14.

By using the navigation system in which the image display according to the fifth embodiment is adopted, with the map image as a background, only the real image (such as a satellite photograph or an air photograph) is fitted into the area $E_1$ of the periphery of the current position one's car for display on the same scale, so that landmarks and the like can be grasped variously.

Sixth Embodiment

A navigation system in which an image display according to a sixth embodiment of the present invention is adopted will now be described below. Here, since the construction of the navigation system is similar to that of the navigation system shown in FIG. 12 except for the microcomputer 1, a microcomputer is marked differently and the other constituent elements are not described below.

Figure 15:
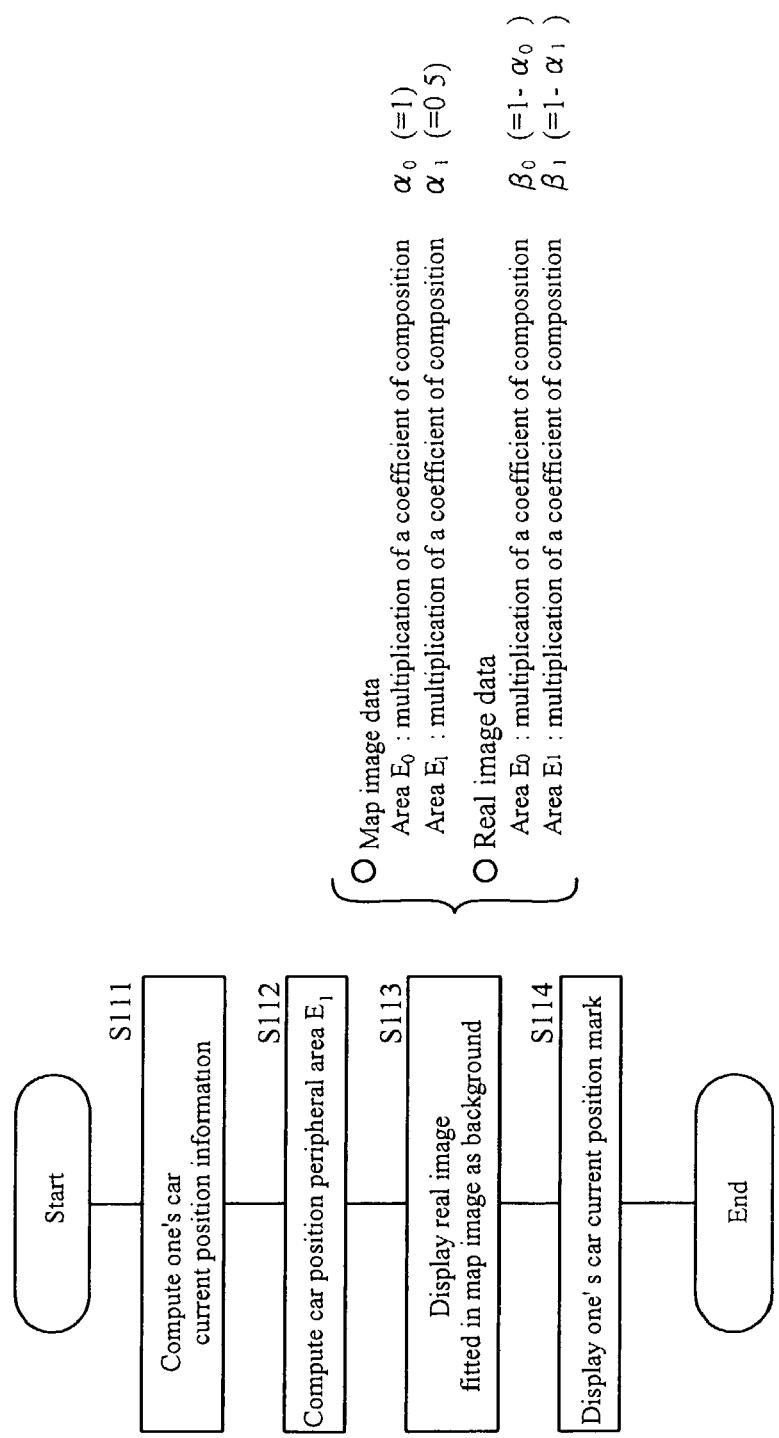
FIG. 15 is a flowchart showing the processing operation which is performed by a microcomputer in a navigation system in which an image display according to a sixth embodiment of the present invention is adopted.

The processing operation ② which is performed by the microcomputer 1A in the navigation system in which the image display according to the sixth embodiment is adopted is described below with reference to a flowchart shown in FIG. 15. First, the current position of one's car is computed from the GPS signals and the like (Step S111), and, based on the computed current position information of one's car, an area $E_1$ of the periphery of the current position of one's car, for example, an area up to some hundreds of radius from the current position of one's car in the center, is computed (Step S112), and, based on the map data and the real image data stored in a RAM 1a, regarding a region including the current position of one's car, a map image is displayed as a background on the display panel 9b and a real image in the same scale as the map image is displayed in an area $E_1$ (Step S113), and then, a mark M showing the current position of one's car is displayed on the display panel 9b (Step S114).

Here, the processing operation in Step 113 is described in more detail. In the case of displaying a map image corresponding to the map data in the remaining region other than the area $E_1$ (an area $E_0$), the microcomputer 1A multiplies the map data by a coefficient of composition $\alpha_0$ (=1), while in the case of displaying the map image in the area $E_1$, the microcomputer 1A multiplies the map data by a coefficient of composition $\alpha_1$ ($0 \leq \alpha_1 \leq 1$), for example, 0.5.

In the case of displaying a real image corresponding to the real image data in the area $E_0$, the microcomputer 1A multiplies the real image data by a coefficient of composition $\beta_0$ (=1−$\alpha_0$, or 0), while in the case of displaying the real image in the area $E_1$, the microcomputer 1A multiplies the real image data by a coefficient of composition $\beta_1$ (=1−$\alpha_1$, for example, 0.5).

That is, since the coefficient of composition $\alpha_0$ is 1 (the coefficient of composition $\beta_0$ is 0), only the map image is displayed in the area $E_0$. Since the coefficient of composition $\alpha_1$ is 0.5 (the coefficient of composition $\beta_1$ is 0.5), the images are displayed so that the map image is seen through the real image in the area $E_1$.

By using the navigation system in which the image display according to the sixth embodiment is adopted, with the map image as a background, the real image (such as a satellite photograph or an air photograph) is overlaid thereon in the area $E_1$ of the periphery of the current position one's car for display in the same scale, so that landmarks and the like can be grasped variously.

Furthermore, since these images are synthesized so that the map image is seen through the real image, it is possible to provide the user with a considerably large amount of information.

Here, in the image display according to the sixth embodiment, in the case of displaying an image in the area $E_1$, the microcomputer 1A multiplies the map data by a coefficient of composition $\alpha_1$ (=0.5), while the microcomputer 1A multiplies the real image data by a coefficient of composition $\beta_1$ (=1−$\alpha_1$), and an image which is obtained by composing these images is displayed in the area $E_1$. However, in an image display according to another embodiment, a coefficient of composition $\alpha_1$ may be varied within the area $E_1$.

For example, by setting a coefficient of composition $\alpha_1$ to be 0 (setting a coefficient of composition $\beta_1$ to be 1) in the center portion of the area $E_1$, making the coefficient of composition $\alpha_1$ larger toward the boundary between the area $E_1$ and the area $E_0$ so that the coefficient of composition $\alpha_1$ becomes 1 just at the boundary, it is possible to make the image shift smoothly from the real image to the map image.

Figure 16:
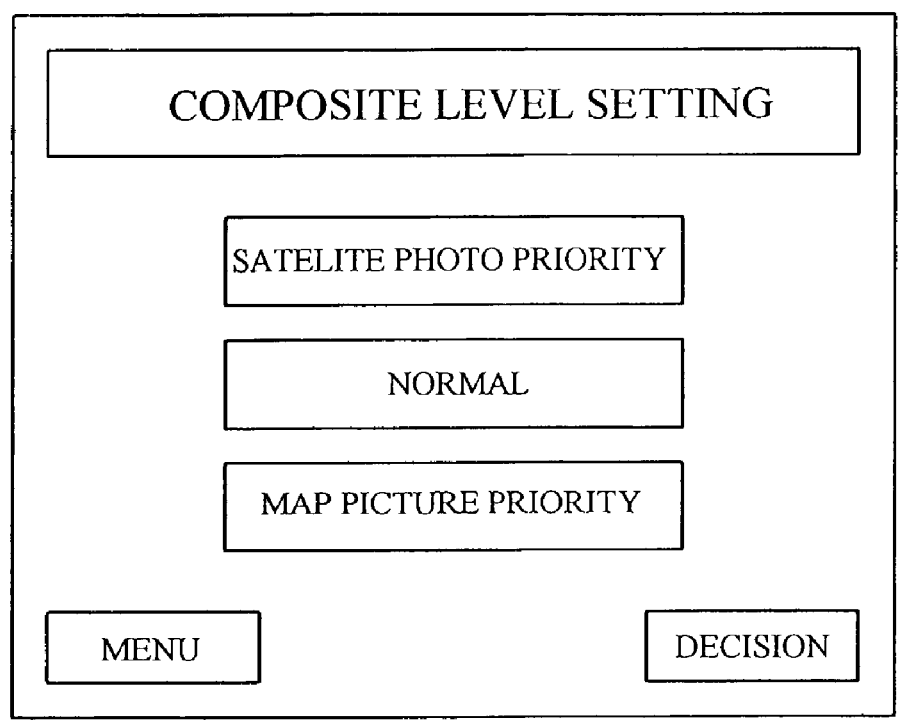
FIG. 16 is an illustration showing an operation screen that is displayed on a display panel of a navigation system in which an image display according to another embodiment is adopted.

In a navigation system in which an image display according to still another embodiment is adopted, through a screen that is displayed on the display panel 9b, the user can carry out various types of settings. For example, through a "COMPOSITE LEVEL SETTING" screen as shown in FIG. 16, the user can freely set a coefficient of composition $\alpha_1$, or a coefficient for determining the transmittance of the map picture to the real picture. Based on the contents that are set through the "COMPOSITE LEVEL SETTING" screen, the microcomputer 1A may conduct the composition of these images, which leads to a realization of a display condition according to the user's preference.

For example, in the case where the "SATELLITE PHOTO PRIORITY" is selected by the user through the "COMPOSITE LEVEL SETTING" screen (see FIG. 16), the coefficient of composition $\alpha_1$ is set to be 0.3 so as to synthesize images. In the case where "NORMAL" is selected, the coefficient of composition $\alpha_1$ is set to be 0.5 so as to synthesize images. And in the case where "MAP PICTURE PRIORITY" is selected, the coefficient of composition $\alpha_1$ is set to be 0.7 so as to synthesize images.

In the image display according to the fifth or sixth embodiment, a case where the real image is overlaid on the map image as a background in the peripheral area $E_1$ of the current position of one's car is described, but the map image may be overlaid on the real image as a background in the peripheral area $E_1$ of the current position of one's car. Further, it may also be possible to allow the user to freely set the switching between these conditions.

In the image display according to the fifth or sixth embodiment, the map image is used as a background, and the real image is overlaid thereon in the peripheral area $E_1$ of the current position of one's car. However, in an image display according to another embodiment, for example, the real image may be overlaid in the goal peripheral area, a peripheral area of a prescribed facility (such as a station) or a peripheral area of a preset position (such as the user's home position) that is pointed to by the user in advance, and moreover, the real image may be displayed in the peripheral area of a guidance route based on route information regarding the guidance route for guiding the user to the goal. For example, the real image is displayed so as to lie along the guidance route with the map image as a background.

Seventh Embodiment

A navigation system in which an image display according to a seventh embodiment of the present invention is adopted will now be described below. Here, since the construction of the navigation system is similar to that of the navigation system shown in FIG. 12 except for the microcomputer 1, a microcomputer is marked differently and the other constituent elements are not described below.

Figure 17:
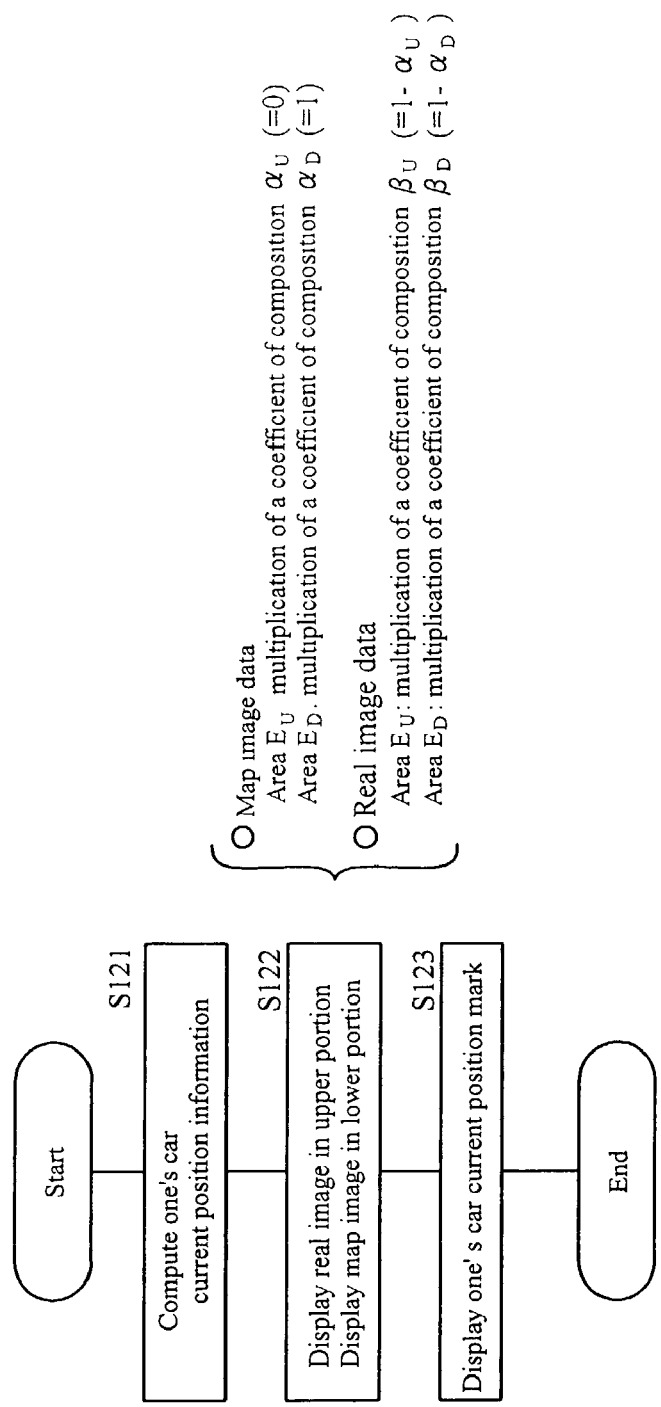
FIG. 17 is a flowchart showing the processing operation which is performed by a microcomputer in a navigation system in which an image display according to a seventh embodiment of the present invention is adopted.

The processing operation ③ which is performed by the microcomputer 1B in the navigation system in which the image display according to the seventh embodiment is adopted is described below with reference to a flowchart shown in FIG. 17. First, the current position of one's car is computed from the GPS signals and the like (Step S121), and, based on the real image data and the map data stored in a RAM 1a, regarding a region including the current position of one's car, a real image is displayed in the upper area $E_U$ on the display panel 9b and a map image in the same scale as the real image is displayed in the lower area $E_D$ thereon (Step S122), and then, a mark M showing the current position of one's car is displayed on the display panel 9b (Step S123).

Here, the processing operation in Step S122 is described in more detail. In the case of displaying a map image corresponding to the map data in the area $E_U$, the microcomputer 1B multiplies the map data by a coefficient of composition $\alpha_U$ (=0), while in the case of displaying the map image in the area $E_D$, the microcomputer 1B multiplies the map data by a coefficient of composition $\alpha_D$ (=1).

In the case of displaying a real image corresponding to the real image data in the area $E_U$, the microcomputer 1B multiplies the real image data by a coefficient of composition $\beta_U$ (=1−$\alpha_U$, or 1), while in the case of displaying the real image in the area $E_D$, the microcomputer 1B multiplies the real image data by a coefficient of composition $\beta_D$ (=1−$\alpha_D$, or 0). A state where the real image is displayed in the upper area $E_U$ while the map image is displayed in the lower area $E_D$ is shown in FIG. 18.

By using the navigation system in which the image display according to the seventh embodiment is adopted, the real image is displayed in the upper area $E_U$ on the display panel 9b, while the map image is displayed in the lower area $E_D$ on the display panel 9b.

By the way, in a navigation system, in many cases, the periphery of the current position of one's car is displayed in the lower portion on the display panel 9b, while a place which is remote from the current position of one's car is displayed in the upper portion on the display panel 9b. Therefore, as described above, by displaying the real image in the area $E_U$ while displaying the map image in the area $E_D$ (the reverse case is also allowed, as a matter of course), it is possible to differentiate an image on this side from an image on the remote side based on the current position of one's car.

Figure 18:
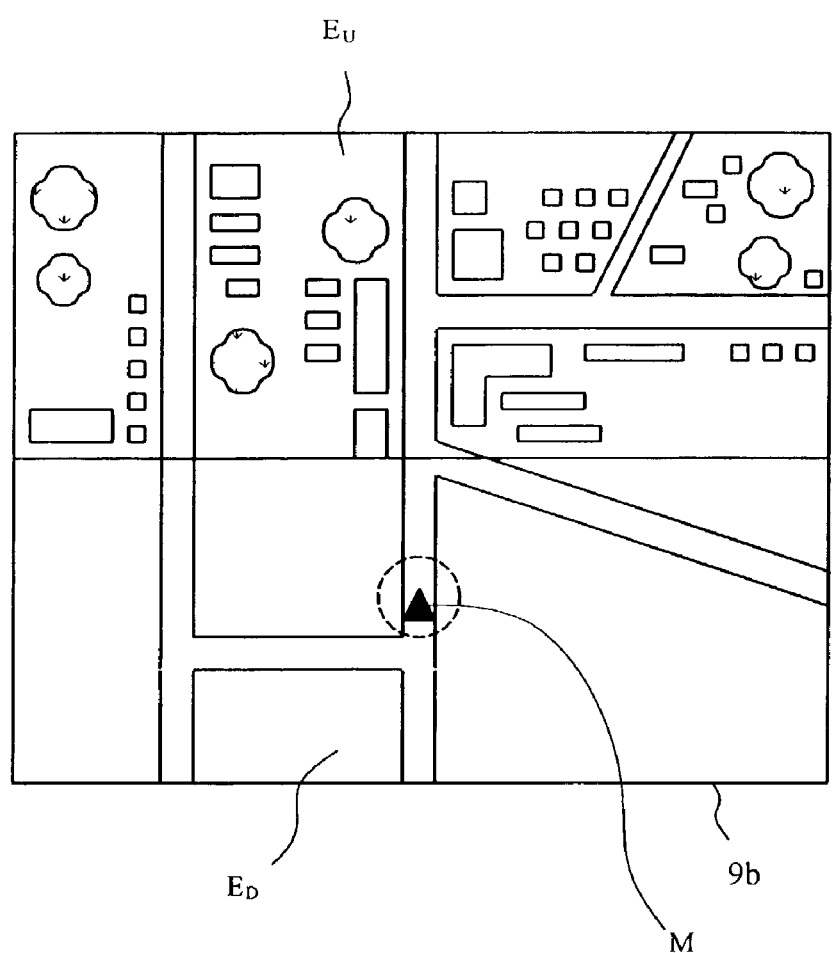
FIG. 18 is an illustration showing an example of a screen state that is displayed on a display panel of a navigation system in which an image display according to another embodiment is adopted.

Here, each image shown in FIGS. 14 and 18 is that of the earth's surface which is seen from almost directly above the earth's surface (an angle of depression θ=90°) (a plane image), but the present invention is not limited to such an image which is seen from almost directly above the earth's surface. An image of the earth's surface seen slantingly (0°<an angle of depression θ<90°, e.g. θ=60°) may be displayed on the display panel 9b.

Eighth Embodiment

A navigation system in which an image display according to an eighth embodiment of the present invention is adopted will now be described below with reference to a block diagram shown in FIG. 12.

A speed sensor 2 for acquiring information regarding the distance in which a vehicle travels by computing the vehicle speed and a gyro sensor 3 for acquiring information regarding the direction in which the vehicle is heading are connected to a microcomputer 1C, which can conclude the position of one's car based on the computed distance information in which the vehicle has traveled and the direction information in which the vehicle is heading (self-contained navigation).

A GPS receiver 4, which receives GPS signals from satellites through an antenna 5, is connected to the microcomputer 1C, which can conclude the position of one's car based on the received GPS signals (GPS navigation).

A DVD drive 6, which can capture map data or real image data from a DVD-ROM 17C (other storage devices are also allowed) in which the map data and the real image data of satellite photographs showing the earth's surface, formed in the same scale as the map data are recorded, is connected to the microcomputer 1C, which, based on the concluded current position information of one's car, route information regarding the below-described guidance route and the like, stores the map data (particularly, the below-described road data, facility data and the like) and the real image data acquired from the DVD-ROM 17C in a RAM 1a within the microcomputer 1C. Here, as a method for allowing the real image data to correspond to the position coordinates, a method is exemplified in which the latitudes and longitudes of the upper left and lower right points of the rectangular area that is shown by the real image data are used.

The map data comprises road data, facility data and the like, and the road data comprises node data and link data. As attached data to the node data, there are coordinates, node IDs and connection information. As attached data to the link data, there are node IDs of both ends, road configurations (coordinates of interpolated points), road types and widths.

Figure 19:
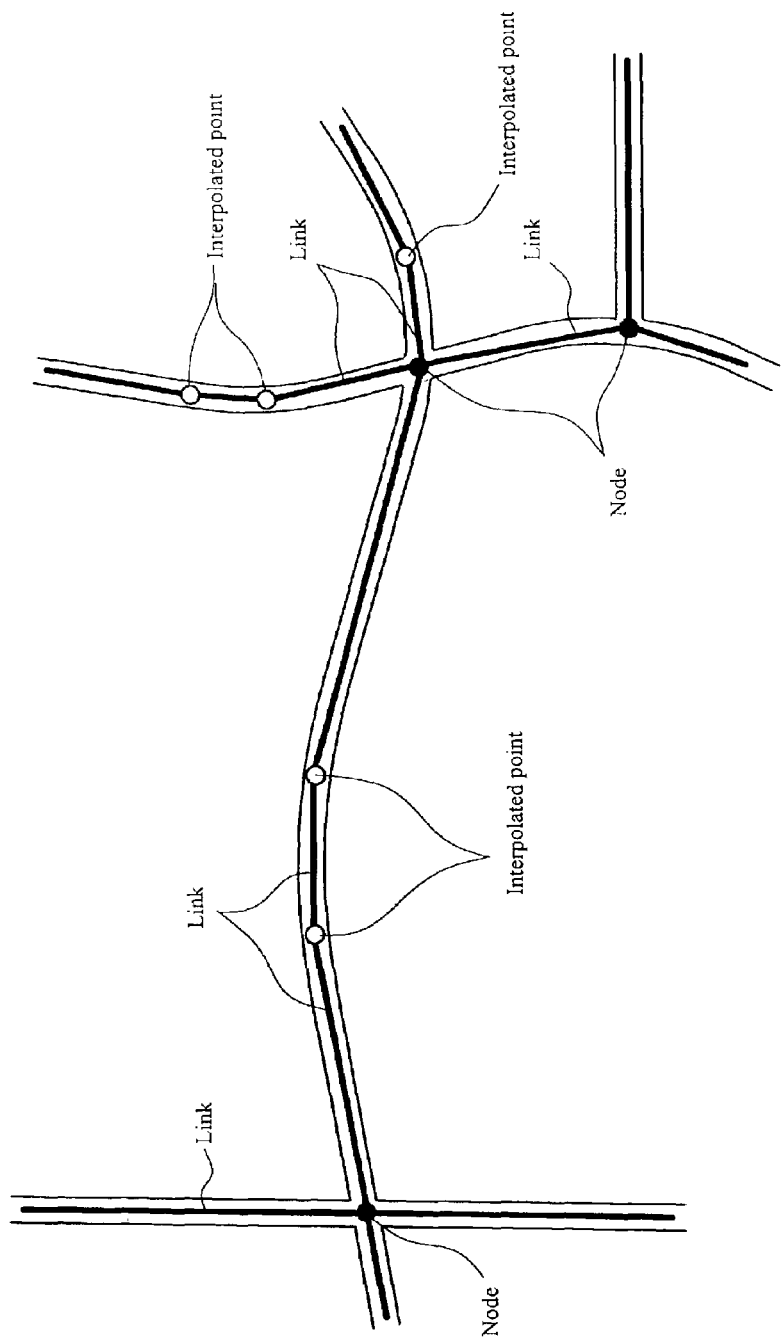
FIG. 19 is an illustration for describing the relationship among nodes, links and interpolated points.

FIG. 19 is an illustration for describing of the relationship among nodes, links, and the interpolated points. As shown in FIG. 19, the nodes are intersections at which a road and another road cross each other, the links are segments through which the node or the interpolated point, and the node or the interpolated point are connected, and the interpolated points are points for expressing the shape of the link.

As shown in FIG. 20, the facility data comprises classifications of facilities (such as a school, convenience store, bank and park), address coordinates showing addresses of the facilities and space information showing the spaces of the facilities.

Figure 21:
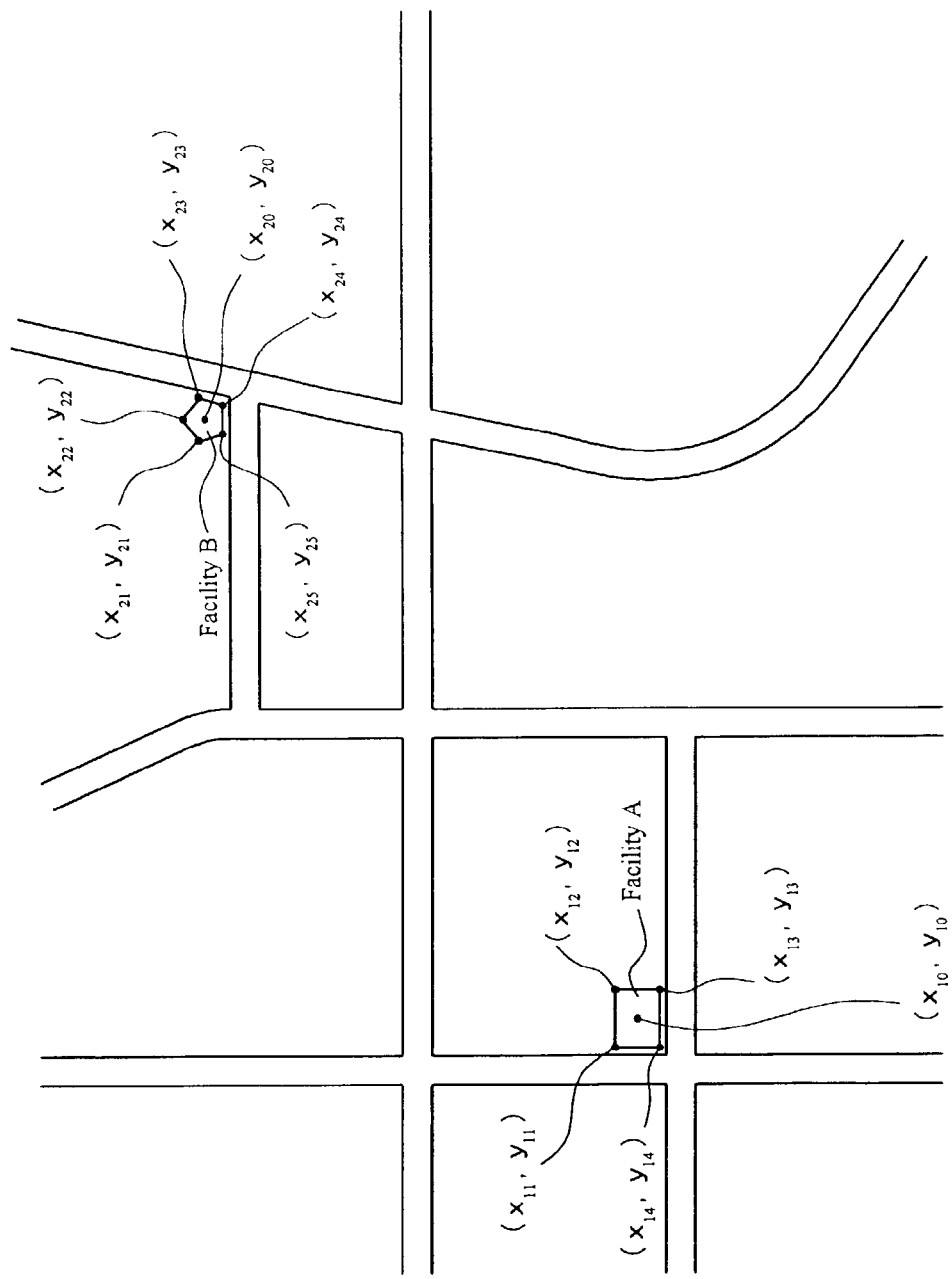
FIG. 21 is an illustration for describing address coordinates and space information.

FIG. 21 is an illustration for describing the address coordinates and the space information, which shows that space information of a facility A comprises the coordinates of four points, $(x_{11}, y_{11})$-$(x_{14}, y_{14})$, and that space information of a facility B comprises the coordinates of five points, $(x_{21}, y_{21})$-$(x_{25}, y_{25})$. FIG. 21 also shows that the address coordinates of the facility A are $(x_{10}, y_{10})$, and that the address coordinates of the facility B are $(x_{20}, y_{20})$ By conducting the map-matching wherein the concluded current position of one's car and the map data (the real image data) are matched, the microcomputer 1C can display a map image (a real image) in which the current position of one's car is precisely shown on a display panel 9b.

Further, switch signals that are output from a joystick 8a or button switches 8b which are arranged on a remote control 8, or switch signals that are output from button switches 9a which are arranged on a monitor 9 are input to the microcomputer 1C, in which the processing corresponding to these switch signals is conducted. For example, when the microcomputer 1C captures information of a goal, transit points and the like from these switches, the microcomputer 1C finds an optimum route from the current position of one's car (starting point) to the goal via the transit points and displays the optimum route as a guidance route with a map picture on the display panel 9b.

At the top, bottom and both sides of the display panel 9b, multiple infrared LEDs and multiple phototransistors are arranged in opposed positions to each other, so that the locations where a finger touches the display panel 9b can be detected. The detected results can be acquired by the microcomputer 1C.

Figure 22:
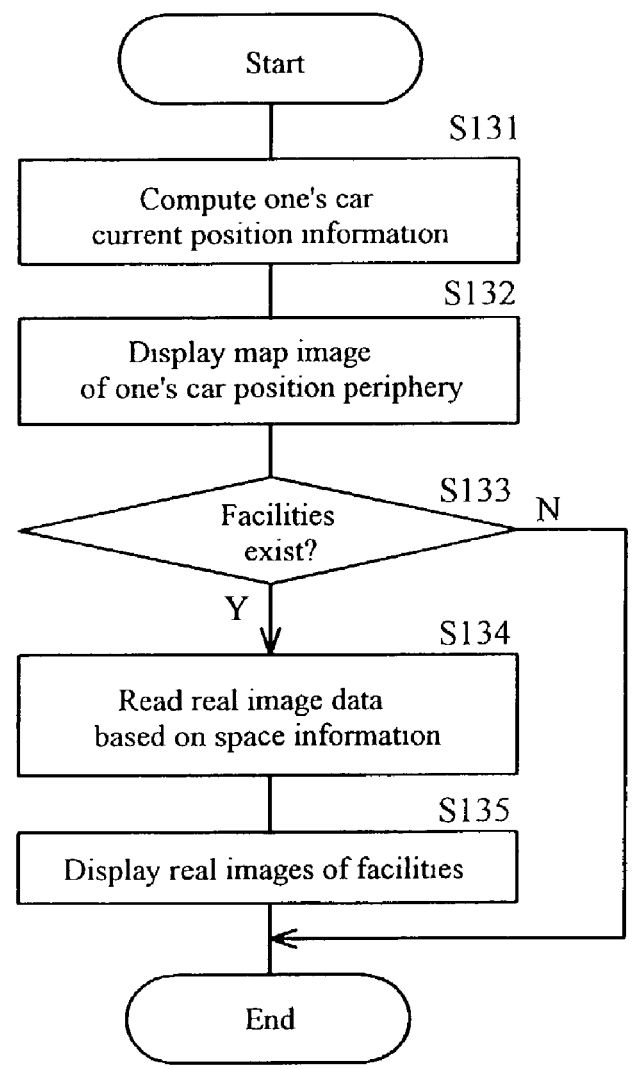
FIG. 22 is a flowchart showing the processing operation which is performed by a microcomputer in the navigation system in which the image display according to the eighth embodiment is adopted.

The processing operation ① which is performed by the microcomputer 1C in the navigation system in which the image display according to the eighth embodiment is adopted is described below with reference to a flowchart shown in FIG. 22. First, the current position of one's car is computed from the GPS signals and the like (Step S131), and, based on the computed current position information of one's car and the map data (particularly road data), a map image showing the periphery of the current position of one's car is displayed on the display panel 9b (Step S132).

Following that, it is judged in Step S133 whether or not facilities that are entered as the facility data exist on the map image appearing on the display panel 9b. When it is judged that the appropriate facilities exist, or that facilities to be displayed on the map image (such as a school $P_1$, a park $P_2$ and a ballpark $P_3$ as shown in the below-described FIG. 23) exist, real image data corresponding to real images showing the facilities is read from a RAM 1a based on space information showing the spaces of the appropriate facilities (Step S134), and then, real images corresponding to the read real image data are displayed in the spaces to be displayed on the map image (or the spaces shown by the space information) (Step S135). On the other hand, when it is judged that no appropriate facility exists in Step S133, the processing operation ① is ended at once.

Figure 23:
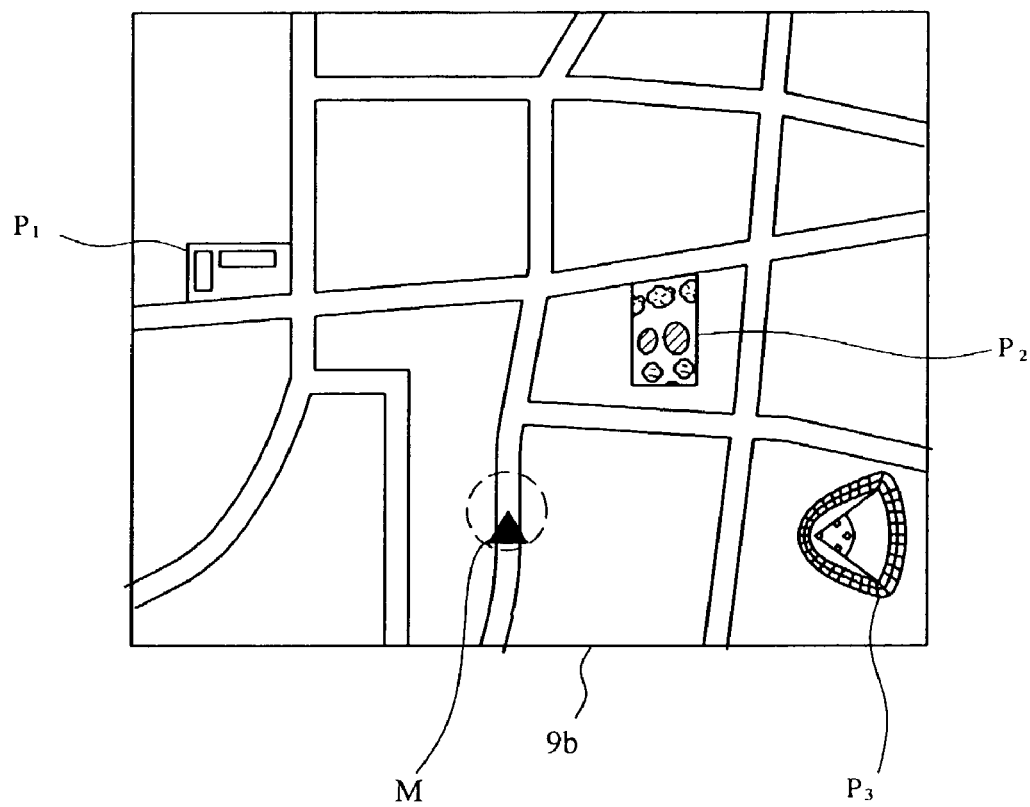
FIG. 23 is an illustration showing an example of a screen state that is displayed on a display panel of the navigation system in which the image display according to the eighth embodiment is adopted.

FIG. 23 is an illustration showing a state where real images showing a school and the like are displayed on a map image appearing on the display panel 9b, wherein M represents a position mark of one's car, and $P_1$-$P_3$ represent real images showing a school, a park and a ballpark, respectively.

By using the navigation system in which the image display according to the eighth embodiment is adopted, in the spaces of facilities (facilities such as a school, a park and a ballpark) on the map image appearing on the display panel 9b, the real images showing the facilities on the same scale as the map image are displayed.

Therefore, the facilities that are displayed on the map image are real images, as a matter of course, and the sizes (plot areas) of the facilities are also displayed similarly to the actual ones, so that it can be made very easy to grasp the situation shown by the map image.

Ninth Embodiment

A navigation system in which an image display according to a ninth embodiment of the present invention is adopted will now be described below. Here, since the construction of the navigation system is similar to that of the navigation system shown in FIG. 12 except for the microcomputer 1C, a microcomputer is marked differently and the other constituent elements are not described below.

Figure 24:
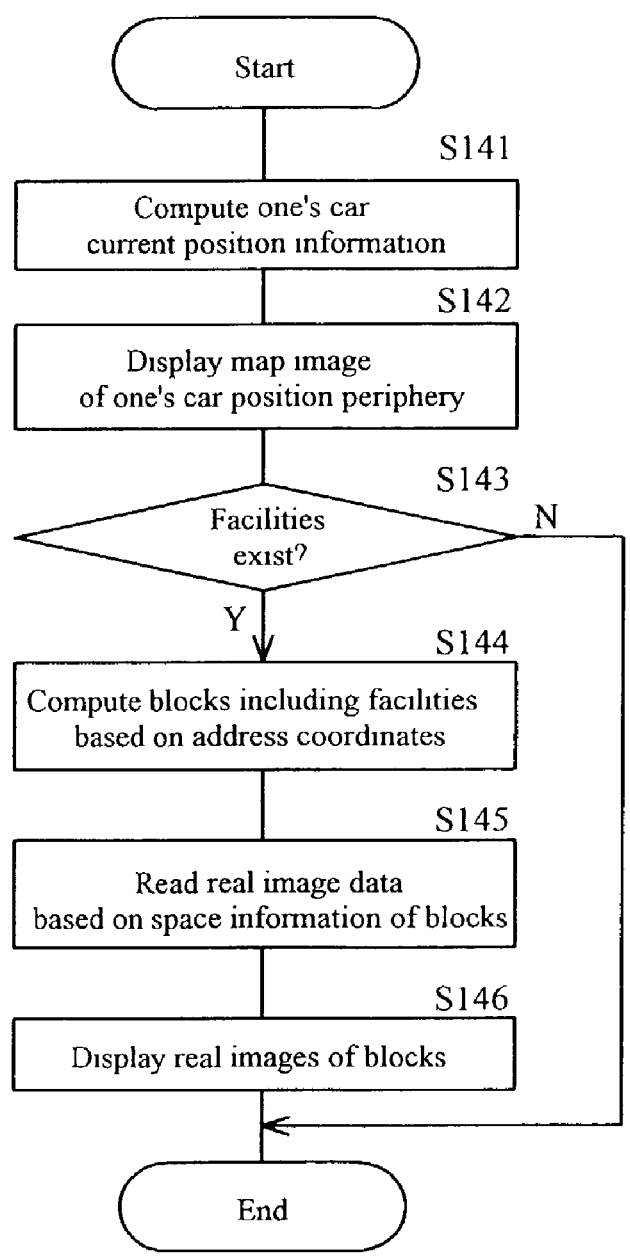
FIG. 24 is a flowchart showing the processing operation which is performed by a microcomputer in a navigation system in which an image display according to a ninth embodiment of the present invention is adopted.

The processing operation ② which is performed by the microcomputer 1D in the navigation system in which the image display according to the ninth embodiment is adopted is described below with reference to a flowchart shown in FIG. 24. First, the current position of one's car is computed from the GPS signals and the like (Step S141), and, based on the computed current position information of one's car and the map data (particularly road data), a map image showing the periphery of the current position of one's car is displayed on a display panel 9b (Step S142).

Figure 25:
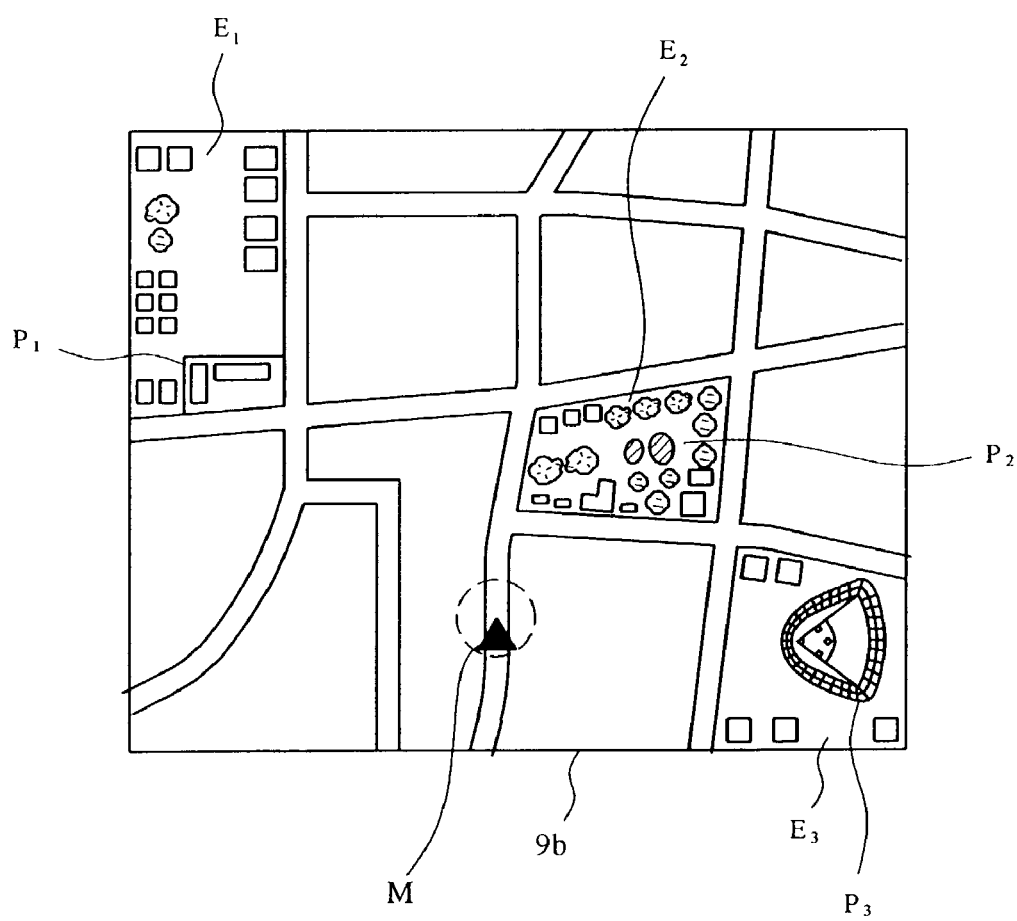
FIG. 25 is an illustration showing an example of a screen state that is displayed on a display panel of the navigation system in which the image display according to the ninth embodiment is adopted.

Following that, it is judged in Step S143 whether or not facilities that are entered as the facility data exist on the map image appearing on the display panel 9b. When it is judged that appropriate facilities exist, or that facilities to be displayed on the map image (such as a school $P_1$, a park $P_2$ and a ballpark $P_3$ as shown in the below-described FIG. 25) exist, blocks (e.g. ranges partitioned by relatively wide roads such as principal roads, blocks $E_1$-$E_3$ as shown in FIG. 25) in which the facilities are included are obtained based on address coordinates showing the addresses of the appropriate facilities and road data (Step S144). Here, as a method for obtaining the blocks, a method is exemplified in which the coordinates of nodes showing the ranges and the coordinates of interpolated points are picked out.

Then, real image data corresponding to real images showing the blocks in which the facilities are included is read from a RAM 1a based on the block space information (such as the coordinates of the nodes and the coordinates of the interpolated points, which show the ranges) (Step S145), and then, real images corresponding to the read real image data are displayed in the spaces to be displayed on the map (or the spaces shown by the space information) (Step S146). On the other hand, when it is judged in Step S143 that no appropriate facility exists, the processing operation ② is ended at once.

FIG. 25 is an illustration showing a state where real images showing blocks in which facilities such as a school are included are displayed on a map image appearing on the display panel 9b, wherein M represents a position mark of one's car, and $P_1$-$P_3$ represent real images showing a school, a park and a ballpark, respectively. $E_1$-$E_3$ therein represent real images showing blocks in which the school $P_1$, park $P_2$ and ballpark $P_3$ are included, respectively.

By using the navigation system in which the image display according to the ninth embodiment is adopted, in the spaces of blocks (the ranges of a school and the like enclosed by relatively wide roads such as principal roads) in which facilities (facilities such as a school, a park and a ballpark) are included on the map image appearing on the display panel 9b, the real images showing the blocks on the same scale as the map image are displayed.

Therefore, the facilities that are displayed on the map image are real images, as a matter of course, and the sizes (plot areas) of the facilities are also displayed similar to the actual sizes, so that it can be made very easy to grasp the situation that is shown by the map image. In addition, since not only the facilities but also the blocks in which the facilities are included are displayed by using real images, it is possible to let the user know the actual situation of not only the facilities but also the surroundings thereof.

In the case of displaying a real image which looks as if only the facility were cut out on the map image, as shown in FIG. 23, space information (or two-dimensional information) showing the space (or plane) of a facility such as a school is required as the facility data. However, in the case of displaying a real image showing a block in which the facility is included, only address information showing the address (or point) of a facility such as a school is needed. Therefore, the image display according to the ninth embodiment has an advantage in that the preparation of the space information of a high level is not required, and the address information of a relatively low level is only required instead.

Tenth Embodiment

A navigation system in which an image display according to a tenth embodiment of the present invention is adopted will now be described below. Here, since the construction of the navigation system is similar to that of the navigation system shown in FIG. 12 except for the microcomputer 1C, a microcomputer is marked differently and the other constituent elements are not described below.

Figure 26:
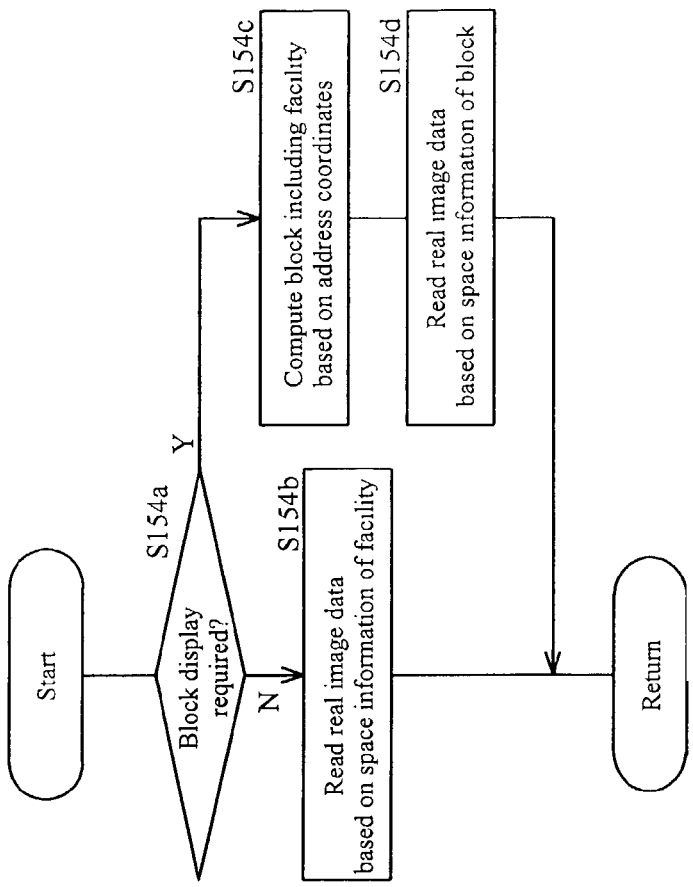
FIGS. 26(a) and 26(b) are flowcharts showing the processing operation performed by a microcomputer in a navigation system in which an image display according to a tenth embodiment of the present invention is adopted.
Figure 26:
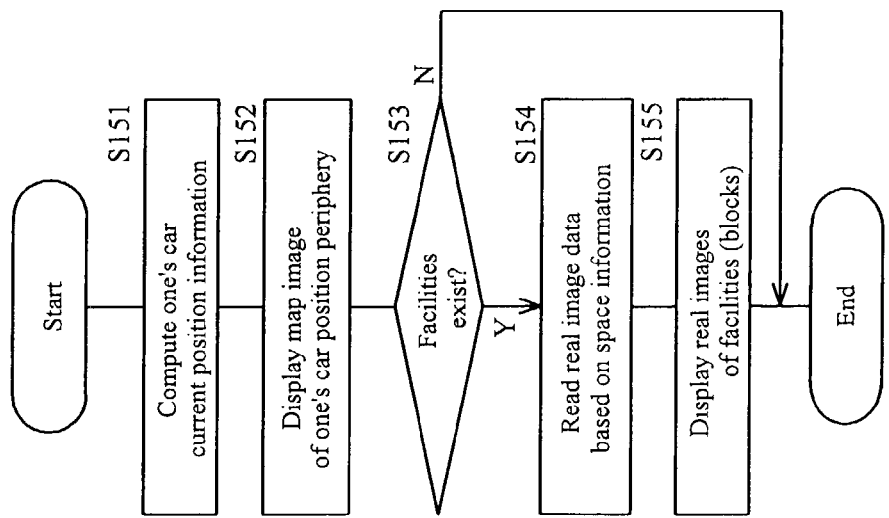

The processing operation ③ which is performed by the microcomputer 1E in the navigation system in which the image display according to the tenth embodiment is adopted is described below with reference to a flowchart shown in FIG. 26(a). First, the current position of one's car is computed from the GPS signals and the like (Step S151), and, based on the computed current position information of one's car and the map data (particularly road data), a map image showing the periphery of the current position of one's car is displayed on a display panel 9b (Step S152).

Following that, it is judged in Step S153 whether or not facilities that are entered as the facility data exist on the map image appearing on the display panel 9b. When it is judged that appropriate facilities exist, or that facilities to be displayed on the map image (such as a school $P_1$, a park $P_2$ and a ballpark $P_3$ as shown in the below-described FIG. 27) exist, real image data corresponding to real images showing the facilities or real images showing blocks is read from a RAM 1a based on space information showing the spaces of the appropriate facilities or space information showing the spaces of the blocks in which the facilities are included (Step S154). Then, real images corresponding to the read real image data are displayed in the spaces to be displayed on the map image (or the spaces shown by the space information) (Step S155). On the other hand, when it is judged that no appropriate facility exists in Step S153, the processing operation ③ is ended at once.

The processing operation in Step S154 is described below in more detail with reference to a flowchart shown in FIG. 26(b). Here, the processing operation is conducted on each facility that should be displayed on the map image.

First, it is judged in Step S154a whether or not the facility should be displayed by block display. Here, the judgment of whether the facility should be displayed by block display is conducted based on the class of the facility, the size thereof and the like. For example, with regard to a facility such as a school or a ballpark whose boundary is relatively clear, a real image showing only the facility is displayed, while with regard to a facility such as a park whose boundary is relatively obscure, a real image showing a block in which the facility is included is displayed.

Figure 27:
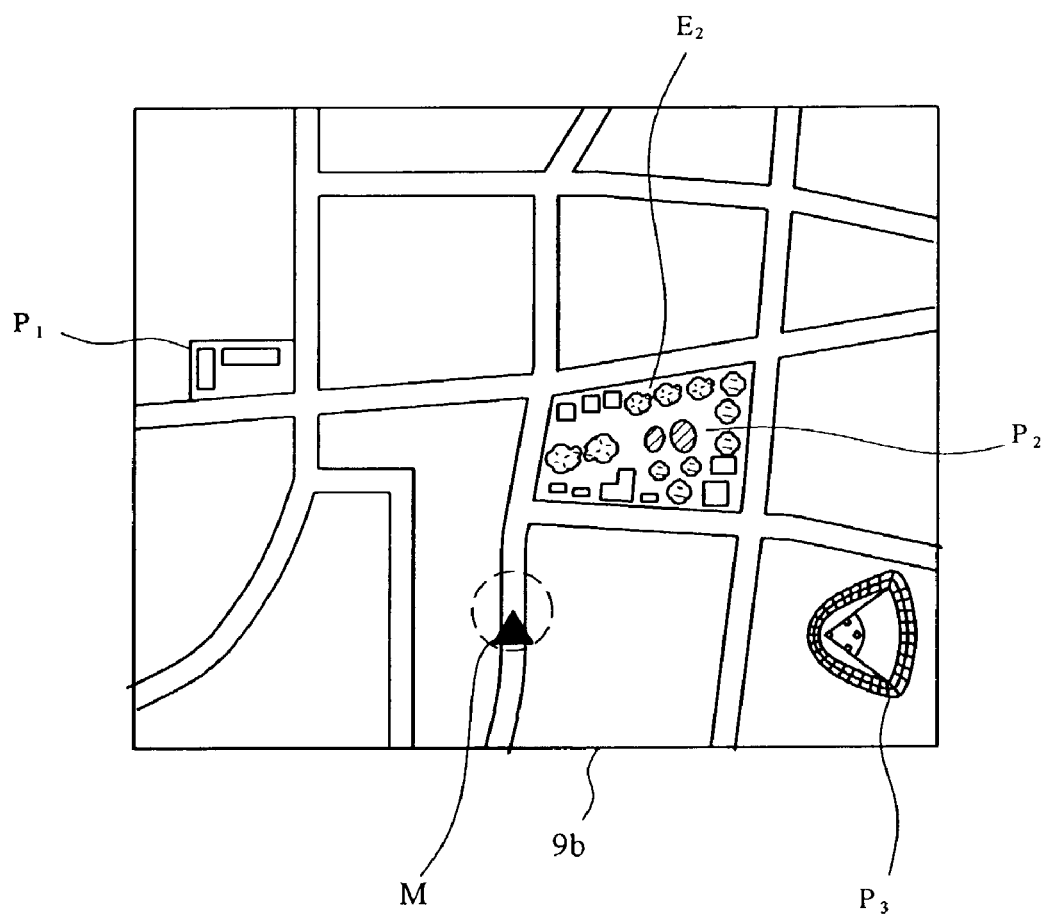
FIG. 27 is an illustration showing an example of a screen state that is displayed on a display panel of the navigation system in which the image display according to the tenth embodiment is adopted.

When it is judged that the facility is not a facility to be displayed by block display in Step S154a, real image data corresponding to a real image showing the facility is read from the RAM 1a based on space information showing the space of the appropriate facility (such as a school $P_1$ or a ballpark $P_3$ as shown in FIG. 27) (Step S154b).

On the other hand, when it is judged that the facility is a facility to be displayed by block display, a block (e.g. a range that is partitioned by relatively wide roads such as principal roads, a block $E_2$ as shown in FIG. 27) in which the facility is included is obtained based on address coordinates showing the address of the facility (e.g. a park $P_2$ shown in FIG. 27) and road data (Step S154c). Then, based on the block space information (such as the coordinates of the nodes and the coordinates of the interpolated points, which show the range), real image data corresponding to a real image showing the block in which the facility is included is read from the RAM 1a (Step S154d).

FIG. 27 is an illustration showing a state where real images showing facilities such as a school and a block in which a park is included are displayed on a map image appearing on the display panel 9b, wherein M represents a position mark of one's car, and $P_1$-$P_3$ represent real images showing a school, a park and a ballpark, respectively. $E_2$ therein represents a real image showing a block in which the park $P_2$ is included.

The navigation system in which the image display according to the tenth embodiment is adopted has a function of displaying the real image showing a facility in the same scale as the map image in the space of the facility on the map image appearing on the display panel 9b, and a function of displaying the real image showing a block in which the facility is included in the same scale as the map image in the space of the block including the facility on the map image. Moreover these functions are properly used depending on a predetermined condition. Therefore, since the displays of real images are properly conducted depending on the condition, a more useful display mode can be realized.

Figure 28:
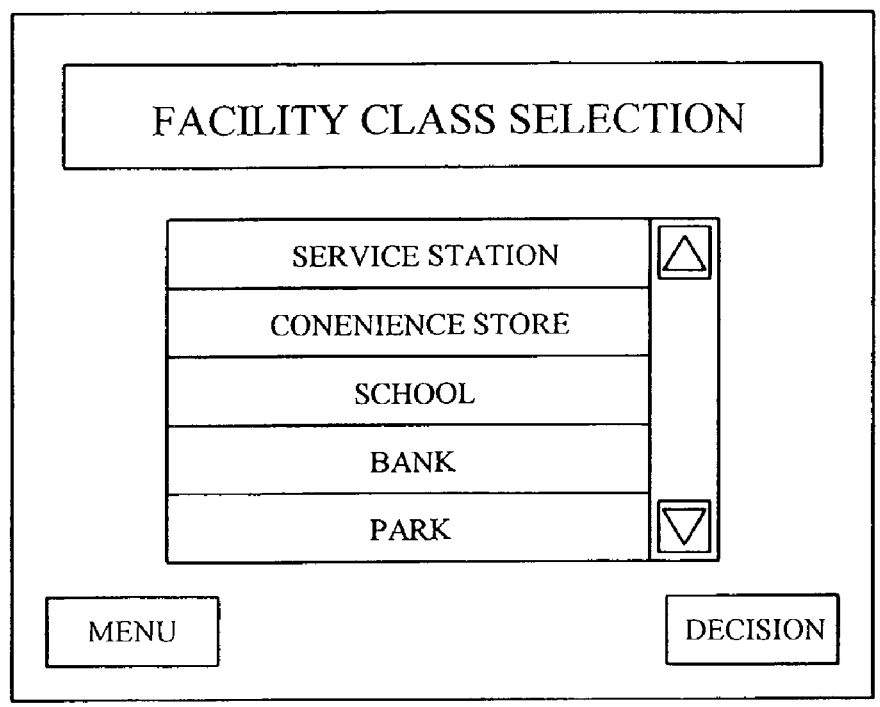
FIG. 28 is an illustration showing an example of an operation screen that is displayed on a display panel of a navigation system in which an image display according to another embodiment is adopted.

Here, in the navigation systems in which the image displays according to the eighth through tenth embodiments are adopted, all of the facilities that are entered as the facility data are displayed by using real images, but in a navigation system in which an image display according to another embodiment is adopted, the user may be able to carry out various types of settings through a screen appearing on the display panel 9b. For example, through the "FACILITY CLASS SELECTION" screen as shown in FIG. 28, the user may be able to select the class of facilities whose real images such as satellite photographs are displayed, and the microcomputers 1C, 1D and 1E may conduct the display control of real images according to the user's command which is selected through the "FACILITY CLASS SELECTION" screen.

In addition, in a navigation system in which an image display according to still another embodiment is adopted, the user may be able to carry out the setting of a real image display concerning not a class of a facility but a specific facility (such as the name or address of a facility), or the facilities may be regarded as facilities to be displayed as the real images by storing the past driving record data in a nonvolatile memory (not shown) so as to find facilities which the user has visited based on the driving record data.

Eleventh Embodiment

A navigation system in which an image display according to an eleventh embodiment of the present invention is adopted will now be described below. Here, since the construction of the navigation system is similar to that of the navigation system shown in FIG. 12 except for the microcomputer 1C, a microcomputer is marked differently and the other constituent elements are not described below.

Figure 29:
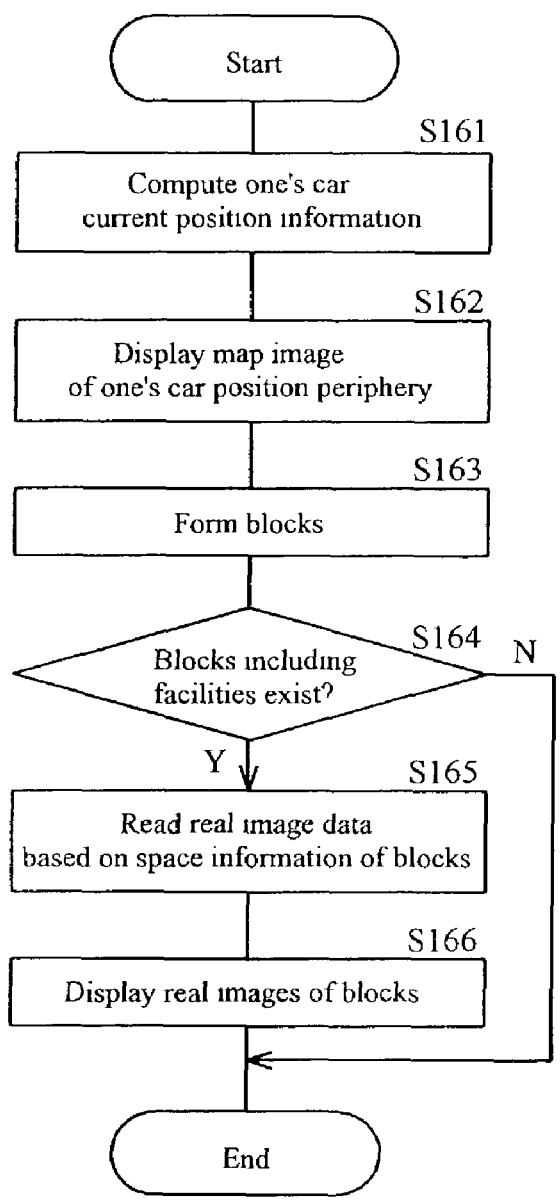
FIG. 29 is a flowchart showing the processing operation which is performed by a microcomputer in a navigation system in which an image display according to an eleventh embodiment of the present invention is adopted.

The processing operation ④ which is performed by the microcomputer 1F in the navigation system in which the image display according to the eleventh embodiment is adopted is described below with reference to a flowchart shown in FIG. 29. First, the current position of one's car is computed from the GPS signals and the like (Step S161), and, based on the computed current position information of one's car and the map data (particularly road data), a map image showing the periphery of the current position of one's car is displayed on a display panel 9b (Step S162).

Figure 30:
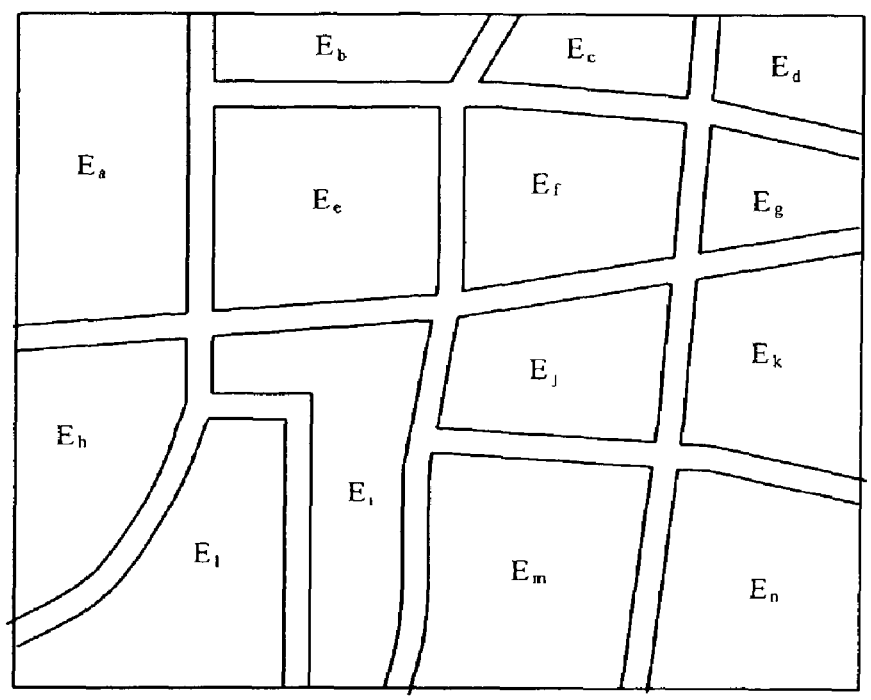
FIG. 30 is an illustration for describing a state where a map picture is partitioned into a certain number of regions.

Following that, the map image appearing on the display panel 9b is partitioned into a certain number of regions according to a predetermined condition so as to form blocks (Step S163). Here, as a method for forming the blocks, a method is exemplified in which several blocks are formed along relatively wide roads such as principal roads based on the road data. The regions of the formed blocks can be expressed with the coordinates of nodes and the coordinates of interpolated points. FIG. 30 is an illustration for describing a state where a map image appearing on the display panel 9b is partitioned into a certain number of regions, wherein $E_a$-$E_n$ each represent a region of each block.

Then, it is judged in Step S164 whether or not blocks including facilities (e.g. a school, a park and a ballpark) that are entered as the facility data exist. When it is judged that appropriate blocks (such as blocks $E_a$, $E_j$ and $E_n$ shown in the below-described FIG. 31) exist, real image data corresponding to real images showing the blocks in which the facilities are included is read from a RAM 1a based on space information of the blocks (Step S165). Then, real images corresponding to the read real image data are displayed in the spaces to be displayed on the map image (or the spaces shown by the space information) (Step S166). On the other hand, when it is judged that no appropriate block exists in Step S164, the processing operation ④ is ended at once.

Figure 31:
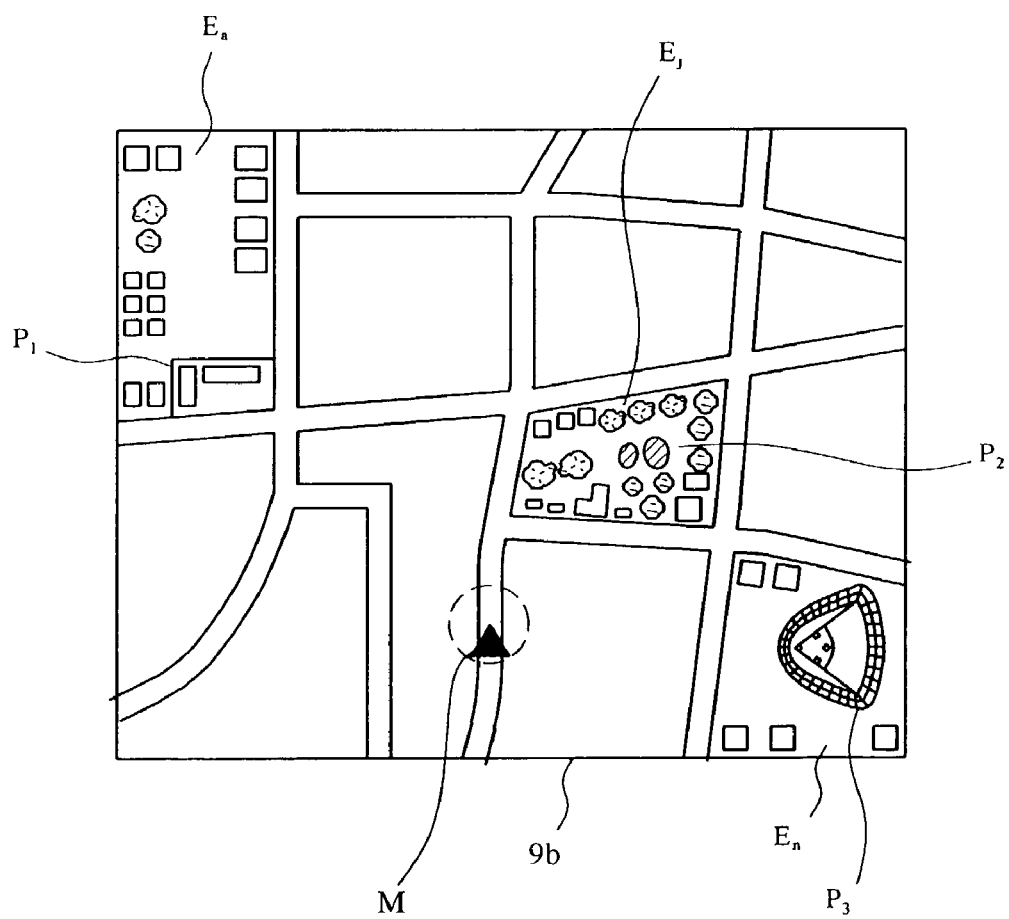
FIG. 31 is an illustration showing an example of a screen state that is displayed on a display panel of the navigation system in which the image display according to the eleventh embodiment is adopted.

FIG. 31 is an illustration showing a state where real images showing blocks in which facilities such as a school are included are displayed on a map image appearing on the display panel 9b, wherein M represents a position mark of one's car, and $P_1$-$P_3$ represent real images showing a school, a park and a ballpark, respectively. $E_a$, $E_j$ and $E_n$ therein each represent a real image of a block in which the school $P_1$, park $P_2$ or ballpark $P_3$ is included.

By using the navigation system in which the image display according to the eleventh embodiment is adopted, in the spaces of blocks (e.g. ranges of a school and the like partitioned by relatively wide roads such as principal roads) including the facilities to be displayed among the blocks that are formed on the map image appearing on the display panel 9b, the real images showing the blocks in the same scale as the map image are displayed.

That is, the real images are displayed as if the real images were fitted in the spaces of blocks including the facilities to be displayed, which makes it considerably easy to grasp the situation which is shown by the map image.

Here, in the navigation system in which the image display according to the eleventh embodiment is adopted, all of the blocks including facilities that are entered as the facility data are displayed using real images, but in a navigation system in which an image display according to another embodiment is adopted, the user may be able to carry out various types of settings through a screen appearing on the display panel 9b. For example, through the "FACILITY CLASS SELECTION" screen (see FIG. 28), the user may be able to select the class of facilities whose real images such as satellite photographs are displayed, and the microcomputer 1F may conduct the display control of real images according to the user's command which is selected through the "FACILITY CLASS SELECTION" screen.

In addition, in a navigation system in which an image display according to still another embodiment is adopted, the user may be able to carry out the setting of a real image display concerning not a class of a facility but a specific facility or zone, or the blocks including the facilities or zones to which the user has been may be displayed with the real images by storing the past driving record data in a nonvolatile memory (not shown) so as to find facilities or zones to which the user has been based on the driving record data.

Twelfth Embodiment

A navigation system in which an image display according to a twelfth embodiment of the present invention is adopted will now described below. Here, since the construction of the navigation system is similar to that of the navigation system shown in FIG. 12 except for the microcomputer 1C, a microcomputer is marked differently and the other constituent elements are not described below.

Figure 32:
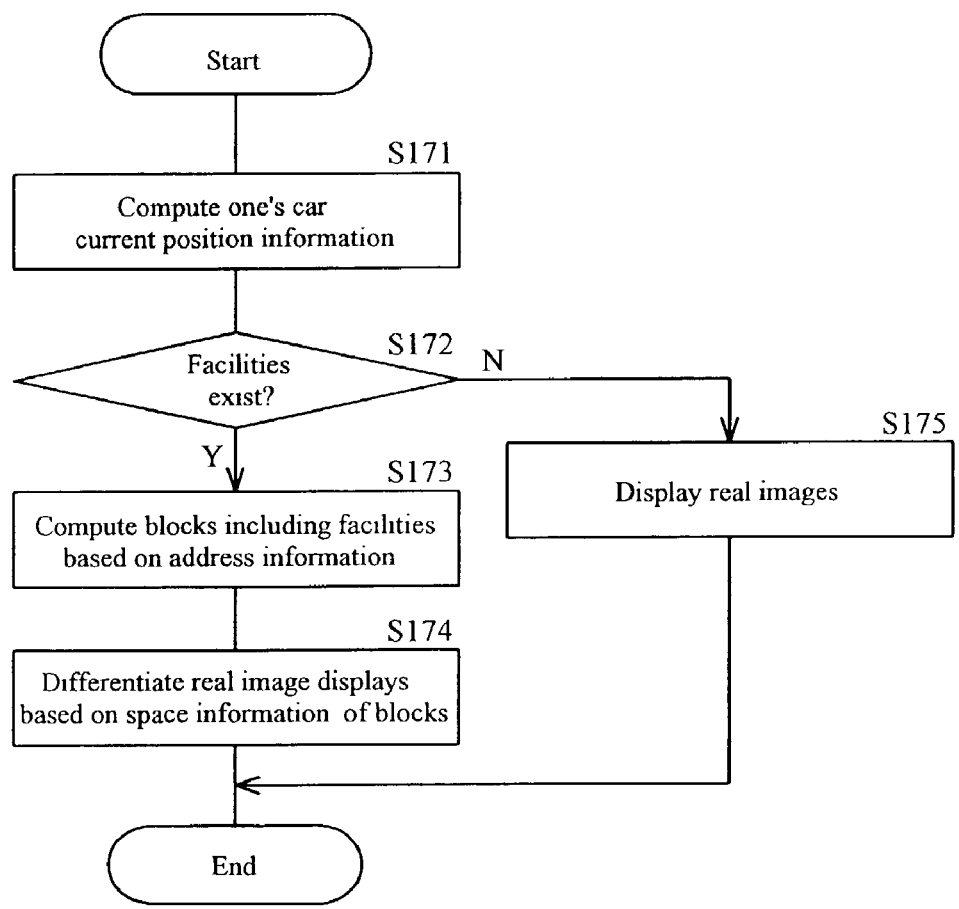
FIG. 32 is a flowchart showing the processing operation which is performed by a microcomputer in a navigation system in which an image display according to an twelfth embodiment of the present invention is adopted.

The processing operation ⑤ which is performed by the microcomputer 1G in the navigation system in which the image display according to the twelfth embodiment is adopted is described below with reference to a flowchart shown in FIG. 32. First, the current position of one's car is computed from the GPS signals and the like (Step S171), and it is judged in Step S172 whether or not facilities that are entered as the facility data exist in the area around the position of one's car are to be displayed on the display panel 9b.

When it is judged that appropriate facilities (such as a school $P_1$, a park $P_2$ and a ballpark $P_3$ shown in the below-described FIG. 33) exist therein, blocks (e.g. ranges which are partitioned by relatively wide roads such as principal roads, blocks $E_1$-$E_3$ shown in FIG. 33) in which the facilities are included are obtained based on address coordinates showing the addresses of the appropriate facilities and road data (Step S173). Here, as a method for obtaining the blocks, a method is exemplified in which the coordinates of nodes and the coordinates of interpolated points, which show the ranges, are picked out.

Then, based on the current position information of one's car computed in Step S171 and the real image data stored in a RAM 1a, a real image showing the periphery of the current position of one's car is displayed on the display panel 9b (Step S174). Here, based on space information of the blocks (such as the coordinates of the nodes and the coordinates of the interpolated points, which show the ranges), the blocks in which the facilities are included (e.g. blocks $E_1$-$E_3$) are displayed with color real images, while the other portion is displayed with a monochrome real image, thereby leading to a differentiation between the blocks and the other portion.

When it is judged that no appropriate facility exists in Step S172, the differentiation of display is not required. Therefore, based on the current position information of one's car computed in Step S171 and the real image data stored in the RAM 1a, a real image showing the periphery of the current position of one's car is displayed by monochrome on the display panel 9b (Step S175).

Figure 33:
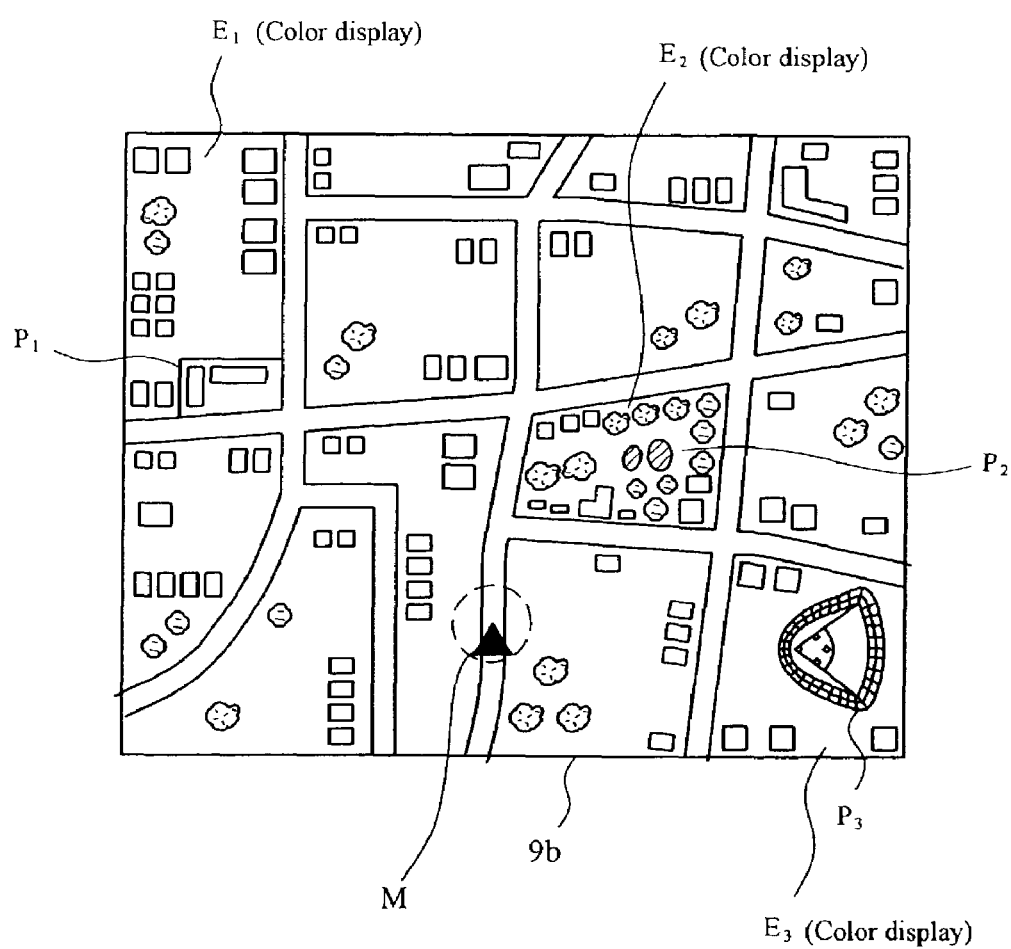
FIG. 33 is an illustration showing an example of a screen state that is displayed on a display panel of the navigation system in which the image display according to the twelfth embodiment is adopted.

FIG. 33 is an illustration showing a state where real images are displayed on the display panel 9b, wherein M represents a position mark of one's car, and $P_1$-$P_3$ represent real images showing a school, a park and a ballpark, respectively. $E_1$-$E_3$ therein each represent a real image of a block in which the school $P_1$, park $P_2$ or ballpark $P_3$ is included.

By using the navigation system in which the image display according to the twelfth embodiment is adopted, when the real images are displayed on the display panel 9b, with differentiating blocks including the facilities entered as the facility data (color display) from the other portion (monochrome display), the real images are displayed.

Therefore, the user can know blocks to which more attention should be paid or the like in an instant, thereby resulting in a realization of a considerably useful unit.

Here, in the navigation system in which the image display according to the twelfth embodiment is adopted, the blocks including facilities that are entered as the facility data and the other blocks are differentiated, but in a navigation system in which an image display according to another embodiment is adopted, the user may be able to carry out various types of settings through a screen appearing on the display panel 9b. For example, through the "FACILITY CLASS SELECTION" screen (see FIG. 28), the user may be able to select the class of facilities whose real images such as satellite photographs are displayed, and the microcomputer 1G may differentiate the blocks including the facilities that are selected through the "FACILITY CLASS SELECTION" screen from the other blocks.

In addition, in a navigation system in which an image display according to still another embodiment is adopted, the user may be able to carry out the setting of a real image display concerning not a class of a facility but a specific facility, or the blocks including the facilities or zones to which the user has been and the other blocks may be differentiated by storing the past driving record data in a nonvolatile memory (not shown) so as to find facilities or zones to which the user has been on the driving record data. Thus, through the contents appearing on the display panel 9b, the user can know which area the user has ever visited in an instant.

In the image displays according to the eighth through twelfth embodiments, only cases where real images showing prescribed facilities (such as a school, a park and a ballpark) or real images showing blocks including the prescribed facilities are displayed have been described, but real images which are shown by the image display according to the present invention are not limited to the prescribed facilities. Real images showing prescribed places or real images showing blocks including the prescribed places are displayed thereby. For example, real images showing rice fields, fields, irrigation ponds and the like, or blocks including rice fields, fields, irrigation ponds and the like may be displayed.

What is claimed is:

1. An image display comprising:
    a display panel configured to substantially simultaneously display a map picture and a photo picture;
    a map data storage device to store map data;
    a map picture preparing device that reads the map data stored in said map data storage device, and prepares the map picture based on the read map data and a first coefficient of composition, $\alpha$;
    a map picture display device that displays the map picture prepared by said map picture preparing device on said display panel;
    a photo data storage device to store first photo data taken by satellite photography or air photography and showing a limited surface area of the earth;
    a photo picture preparing device that reads second photo data regarding a current position of one's own based on current position information indicating the current position of the one from said photo data storage device, and prepares a photo picture showing a periphery of the current position of the one based on the second photo data and a second coefficient of composition, $\beta$, such that the photo picture includes second photo data only within the periphery of the current position of the one;
    a position judging device that judges whether the one is within the area based on the current position information; and
    a photo picture display device that overlays the photo picture on a corresponding area of the map picture for display on said display panel when said position judging device judges that the one is within the area, and displays a current position mark on the displayed photo picture;
    wherein when said position judging device judges that the one is within the area, the one is automatically notified of entering into the area by said photo picture display device changing a displayed color of the current position mark on the displayed photo picture as an indicator of being within the area.

2. An image display in accordance with claim 1 wherein the second coefficient of composition $\beta$ is one of $1-\alpha$ and 1.

3. An image display in accordance with claim 1 wherein the one is able to determine which photo picture to display based on a past driving record of the one.

4. An image display comprising:
    a display panel configured to substantially simultaneously display a map picture and a photo picture;
    a map data storage device to store map data;
    a map picture preparing device that reads the map data stored in said map data storage device, and prepares the map picture based on the read map data and a first coefficient of composition, $\alpha$;
    a map picture display device that displays the map picture prepared by said map picture preparing device on said display panel;
    a photo data storage device to store first photo data taken by satellite photography or air photography and showing a limited surface area of the earth;
    a photo picture preparing device that reads second photo data regarding a current position of one's own based on current position information indicating the current position of the one from said photo data storage device, and prepares a photo picture showing a periphery of the current position of the one based on the second photo data and a second coefficient of composition, $\beta$, such that the photo picture includes second photo data only within the periphery of the current position of the one;
    a position judging device that judges whether the one is within the area based on the current position information;
    a notification image generating device that generates a notification image overlaid on the displayed map picture when the position judging device judges that the one is within the area; and
    a photo picture display device that overlays the photo picture in a corresponding area of the map picture for display on said display panel in response to a user commanding, by touching the notification image overlaid on the displayed map picture, that the photo picture be displayed in the corresponding area of the map picture instead of the map picture when said position judging device judges that the one is within the area, and displays a current position mark on the displayed photo picture.

5. An image display in accordance with claim 4 wherein the second coefficient of composition $\beta$ is one of $1-\alpha$ and 1.

6. An image display comprising:
    a display panel configured to substantially simultaneously display a map picture and a photo picture;
    a map data storage device to store map data;
    a map picture preparing device that reads the map data stored in said map data storage device, and prepares the map picture based on the read map data and a first coefficient of composition, $\alpha$;

a map picture display device that displays the map picture prepared by said map picture preparing device on said display panel;

a photo data storage device that stores first photo data taken by satellite photography or air photography and showing a limited surface area of the earth;

a photo picture preparing device that reads second photo data regarding a current position of one's own based on current position information indicating the current position of the one from said photo data storage device, and prepares a photo picture showing a periphery of the current position of the one based on the second photo data and a second coefficient of composition, $\beta$, such that the photo picture includes second photo data only within the periphery of the current position of the one;

a position judging device that judges whether the one is within the area based on the current position information;

a switch forming device that forms a command switch which a user can turn on to command that the photo picture be displayed when said position judging device judges that the one is within the area; and a photo picture display device that overlays the photo picture in a corresponding area of the map picture for display on said display panel when the user turns on the command switch and displays a current position mark on the displayed photo picture, wherein said switch forming device forms the command switch on the displayed map picture only when said position judging device judges that the one is within the area so as to allow the one to command that the photo picture be displayed instead of the map picture.

7. An image display in accordance with claim 6 wherein the second coefficient of composition $\beta$ is one of $1-\alpha$ and 1.

* * * * *